United States Patent [19]
Hickey et al.

[11] Patent Number: 5,627,977
[45] Date of Patent: May 6, 1997

[54] TRAINABLE USER INTERFACE TRANSLATOR

[75] Inventors: Neil Hickey, Kennebunk, Me.; Robert W. Anthony, Wellesley, Mass.; Seth A. Spiller, York, Me.

[73] Assignee: Orchid Systems, Inc., Wellsesley, Mass.

[21] Appl. No.: 229,935

[22] Filed: Apr. 19, 1994

[51] Int. Cl.$^6$ ............................................. G06F 15/00
[52] U.S. Cl. ............... 395/329; 395/200.01; 395/200.09
[58] Field of Search .................................. 395/161, 163, 395/164, 155, 157

[56] References Cited

U.S. PATENT DOCUMENTS

| | | | |
|---|---|---|---|
| 5,179,700 | 1/1993 | Ainana et al. | 395/650 |
| 5,241,625 | 8/1993 | Epart et al. | 395/163 |
| 5,349,678 | 9/1994 | Morris et al. | 395/800 |
| 5,410,141 | 4/1995 | Koenck et al. | 235/472 |

OTHER PUBLICATIONS

IBM Technical Disclosure Bulletin, "Addition of New Ehllapi Parameter to Hide Non–Display–Type Fields", p. 90, vol. 33, No. 5, Oct. 1990, New York, US.

IBM Technical Disclosure Bulletin, "System for Assessing a Mainframe from a Workstation User Interface", pp. 290–291, vol. 32, No. 4A, Sep. 1989, New York, US.

IBM Technical Disclosure Bulletin, "Intelligent Keystroke Capture for Personal Computers", p. 132, vol. 33, No. 3B, Aug. 1990, New York, US.

Dr. Dobb's Journal, "Remote Connectivity for Portable Terminals Part II", pp. 70–71, 148–149, vol. 16, No. 3, Mar. 1991, US.

*Primary Examiner*—Mark R. Powell
*Assistant Examiner*—Huynh Ba
*Attorney, Agent, or Firm*—Choate, Hall & Stewart

[57] ABSTRACT

An apparatus and method for converting a first user interface used for existing applications running on a host computer to a second user interface for use on a client computer. The apparatus intercepts prompts and request for input from the host, converts them to a form appropriate for use on the client computer, and passes the converted prompts and requests to the client. The apparatus can store information for use at a later prompt or request, branch on the stored value to vary path execution, and handle errors generated by incorrect input.

7 Claims, 75 Drawing Sheets

Fig. 11 Step 2

Step 2

Step 3

Fig. 15 Step 3

Step 3

Step 3

Step 3

Step 3

Fig. 22 Step 4

Step 4

Step 5

Fig. 28 Step 7

Step 7

| File | Vars | Host | Client | Misc. | | Monitor |
|---|---|---|---|---|---|---|

Host

RealWorld Software
Version 6.5
Data Look Up Utility 3.0 (C) 1992, 1993 by Datatech
(C) Copyright 1986, 1987, 1988, 1989, 1990, 1991, 1992 by RealWorld Corporation ALL RIGHTS RESERVED. No part of this material may be reproduced or transmitted in any form or by any means, electronic, mechanical or otherwise, without written permission from RealWorld Corporation.

> This software may be used only as authorized by a valid "RealWorld Software License". If you have not read and agreed to such license, do not continue. If you need another copy of the license, contact your supplier or RealWorld Corporation at Loudon Road, Concord, New Hampshire 03301 USA. (Telephone 800-678-6336.)

Press ENTER to continue, or ESC to exit

Step 0

Fig. 32

| File | Vars | Host | Client | Misc. | Menu |
|------|------|------|--------|-------|------|

```
                              Start New Path
                              End Path
                              Loop
                              Exec Procedure
                    Host
```

RealWorld Software
Version 6.5
Data Look Up Utility 3.0 (C) 1992, 1993 by Datatech
(C) Copyright 1986, 1987, 1988, 1989, 1990, 1991, 1992 by RealWorld Corporation ALL RIGHTS RESERVED. No part of this material may be reproduced or transmitted in any form or by any means, electronic, mechanical or otherwise, without written permission from RealWorld Corporation.

> This software may be used only as authorized by a valid "RealWorld Software License". If you have not read and agreed to such license, do not continue. If you need another copy of the license, contact your supplier or RealWorld Corporation at Loudon Road, Concord, New Hampshire 03301 USA. (Telephone 800-678-6336.)

Press ENTER to continue, or ESC to exit _

Step 0

Fig. 33

| File | Vars | Host | Client | Misc. | Menu |
|------|------|------|--------|-------|------|

Assign Path Name
Path Name: nav_menus

Host

RealWorld Software
Version 6.5
Data Look Up Utility 3.0 (C) 1992, 1993 by Datatech
(C) Copyright 1986, 1987, 1988, 1989, 1990, 1991, 1992 by RealWorld Corporation ALL RIGHTS RESERVED. No part of this material may be reproduced or transmitted in any form or by any means, electronic, mechanical or otherwise, without written permission from RealWorld Corporation.

This software may be used only as authorized by a valid "RealWorld Software License". If you have not read and agreed to such license, do not continue. If you need another copy of the license, contact your supplier or RealWorld Corporation at Loudon Road, Concord, New Hampshire 03301 USA. (Telephone 800-678-6336.)

Press ENTER to continue, or ESC to exit

Step 0

Fig. 35

File   Vars   Host   Client   Misc.                                    Menu

Define Screen Match

```
              Loc     Len   Expected
Wait For:              10   1 x [H_\e[24;42H]
Match at:    24,14     26   [o continue, or ESC to exi
Match at:     1,1       0   []
```

RealW
Version 0.0

Data Look Up Utility 3.0 (C) 1992, 1993 by Datatech
(C) Copyright 1986, 1987, 1988, 1989, 1990, 1991, 1992 by RealWorld Corporation
ALL RIGHTS RESERVED. No part of this material may be reproduced or transmitted in any form or by any means, electronic, mechanical or otherwise, without written permission from RealWorld Corporation.

This software may be used only as authorized by a valid "RealWorld Software License". If you have not read and agreed to such license, do not continue. If you need another copy of the license, contact your supplier or RealWorld Corporation at Loudon Road, Concord, New Hampshire 03301 USA. (Telephone 800-678-6336.)

Press ENTER to continue, or ESC to exit _

Step 1                                  Fig. 38

| File | Vars | Host | Client | Misc. | Monitor |
|------|------|------|--------|-------|---------|

Host

RealWorld Software
Version 6.5

Please enter your initials: ___

Press F1 for version numbers
Press F2 for forms ordering info

Step 3

Fig. 42

| File | Vars | Host | Client | Misc. | Monitor |
|------|------|------|--------|-------|---------|

Host

Inventory
Enter
1. Item #
   Warehouse

2. Type                                    Stocking Unit

3. Transaction date
4. Document #                              New qty avail
                                           New whs avail F1 = next entry    F2 = next item    blank = look up by description Step 0

Fig. 43

| File | Vars | Host | Client | Misc. | Menu |
|---|---|---|---|---|---|

Current Path start_rw not ended.
- T. Terminate Path
- E. Link to Existing Path
- N. Link to New Path
- C. Cancel Add Path Select [T,E,N,C] N Inventory
Enter
1. Item #
   Warehouse 2. Type                    Stocking Unit 3. Transaction date
4. Document #

New qty avail
                           New whs avail

F1 = next entry    F2 = next item    blank = look up by description

Step 0

Fig. 44

| File | Vars | Host | Client | Misc. | | Menu |
|------|------|------|--------|-------|---|------|

Assign Path Name
Path Name: item_transfer

——————————— Host ———————————

Inventory
Enter
1. Item #
   Warehouse
2. Type                              Stocking Unit
3. Transaction date
4. Document #                        New qty avail
                                     New whs avail F1 = next entry    F2 = next item    blank = look up by description Step 0

Fig. 45

| File | Vars | Host | Client | Misc. | | Menu |
|---|---|---|---|---|---|---|

Clear Client Screen
Enable: Y

Host
_____

Inventory
Enter
1. Item #
   Warehouse

2. Type                    Stocking Unit

3. Transaction date
4. Document #              New qty avail
                           New whs avail F1 = next entry    F2 = next item    blank = look up by description Step 1

Fig. 46

| File | Vars | Host | Client | Misc. | | Menu |
|---|---|---|---|---|---|---|

Move Client Cursor
Row: 1
Col: 1

Host

Inventory
Enter
1. Item #
   Warehouse

2. Type                    Stocking Unit

3. Transaction date
4. Document #              New qty avail
                           New whs avail F1 = next entry   F2 = next item   blank = look up by description Step 2

Fig. 47

| File | Vars | Host | Client | Misc. | Menu |

Send to Client

| | Type | Value |
|---|---|---|
| Data 1: | <empty> | |
| Data 2: | Text | |
| Data 3: | Special Char(s) | |
| Data 4: | Variable | |

Inven
Enter

1. Item #
   Warehouse

2. Type                           Stocking Unit

3. Transaction date
4. Document #                     New qty avail
                                  New whs avail F1 = next entry    F2 = next item    blank = look up by description Step 2

Fig. 48

| File | Vars | Host | Client | Misc. | Menu |
|---|---|---|---|---|---|

Send to Client
    Type    Value
Data 1:  Text    item:
Data 2:  <empty>
Data 3:  <empty>
Data 4:  <empty>

Inven
Enter

1.  Item #
    Warehouse

2.  Type                            Stocking Unit

3.  Transaction date
4.  Document #              New qty avail
                                     New whs avail F1 = next entry    F2 = next item   blank = look up by description Step 3

Fig. 49

| File | Vars | Host | Client | Misc. | Menu |
|---|---|---|---|---|---|

Declare New Variable
Variable: item

―――――――― Host ――――――――

Inventory
Enter
1. Item #
   Warehouse
2. Type                              Stocking Unit
3. Transaction date
4. Document #                        New qty avail
                                     New whs avail F1 = next entry    F2 = next item    blank = look up by description Step 4

Fig. 50

Step 5

Step 5

| File | Vars | Host | Client | Misc. | | Menu |
|------|------|------|--------|-------|--|------|

Assign Path Name
Path Name: update_host

Host
―――――――――――

Inventory
Enter
1. Item #
   Warehouse

2. Type                           Stocking Unit

3. Transaction date
4. Document #                     New qty avail
                                  New whs avail F1 = next entry    F2 = next item    blank = look up by description

Fig. 53

Step 0

| File | Vars | Host | Client | Misc. | Menu |

Clear Client Screen
Enable: Y

———————— Host ————————

Inventory
Enter
1. Item #
   Warehouse
2. Type                          Stocking Unit
3. Transaction date
4. Document #                    New qty avail
                                 New whs avail F1 = next entry   F2 = next item   blank = look up by description Step 1

Fig. 54

| File | Vars | Host | Client | Misc. | Menu |

Host

Move Client Cursor
Row: 1
Col: 1

Inventory
Enter
1. Item #
   Warehouse

2. Type                                    Stocking Unit

3. Transaction date
4. Document #                              New qty avail
                                           New whs avail F1 = next entry   F2 = next item   blank = look up by description Step 2

Fig. 55

| File | Vars | Host | Client | Misc. | Menu |

Send to Client
    Type    Value
Data 1:  Text    Processing Data
Data 2:  <empty>
Data 3:  <empty>
Data 4:  <empty>

Inven
Enter

1. Item #
   Warehouse

2. Type                Stocking Unit

3. Transaction date
4. Document #          New qty avail
                        New whs avail F1 = next entry   F2 = next item   blank = look up by description Step 3

Fig. 56

| File | Vars | Host | Client | Misc. | | Menu |
|---|---|---|---|---|---|---|

Wait for Host Response(s)
Possible Response   Test Type       Destination Path                    No.

0. Normal Response  automatic
1.                  -- unused --                                        0
2.                  -- unused --                                        0
3.                  -- unused --                                        0
4.                  -- unused --                                        0
5.                  -- unused --                                        0
6. None of the Above --- none ---   item_error                          0
Wait a maximum of 100 x .1 sec Inven
Enter
1.
2.

3. Transaction date
4. Document #

New qty avail
New whs avail

F1 = next entry   F2 = next item   blank = look up by description

Note: Error handling will be provided in the None of the Above path "item_error". Time out set for 100 x .1 = 10 seconds.

Fig. 57

Step 4

| File | Vars | Host | Client | Misc. | Menu |

```
Wait f...
Possib...                                                    No.
  0. Nor        Path item_error doesn't exist                 o
  1.                        D. Declare pathname               o
  2.                        R. Respecify Pathname             o
  3.                        C. Cancel Operation               o
  4.                        Select [D,R,C]: D                 o
  5.                   -- unused --                           o
                      -- unused --
                      -- unused --
  6. None of the Above -- none --        item_error
  Wait a maximum of 100 x .1 sec Inven...
Enter...
  1.
  2.

3.   Transaction date                   New qty avail
  4.   Document #                          New whs avail F1 = next entry    F2 = next item    blank = look up by description
```

Step 4

Fig. 58

| File | Vars | Host | Client | Misc. | Menu |

Send to Host

| | Type | Variable | Value |
|---|---|---|---|
| Data 1: | Variable | item | |
| Data 2: | Special Char(s) | <cr> | |
| Data 3: | <empty> | | |
| Data 4: | <empty> | | |

Inven
Enter

1. Item #
   Warehouse

2. Type           Stocking Unit

3. Transaction date
4. Document #     New qty avail
                   New whs avail F1 = next entry   F2 = next item   blank = look up by description

Fig. 59

Step 5

| File | Vars | Host | Client | Misc. | Monitor |
|------|------|------|--------|-------|---------|

Host

Inventory
Enter
1. Item #            1            Paint, Black
   Warehouse
2. Type                           Stocking Unit    EACH
3. Transaction date
4. Document #                     New qty avail
                                  New whs avail Leave blank for "Central"

Step 5

Fig. 60

| File | Vars | Host | Client | Misc. | Menu |
|------|------|------|--------|-------|------|

Wait for Host Response(s)
Possible Response  Test Type            Destination Path                    No.

0. Normal Response  automatic                                               0
1.                  -- unused --                                            0
2.                  -- unused --                                            0
3.                  -- unused --                                            0
4.                  -- unused --                                            0
5.                  -- unused --                                            0
6. None of the Above --- none ---                                           0
Wait a maximum of 0 x .1 sec Inven
Enter
1.

2.

3. Transaction date
4. Document #                            New qty avail
                                         New whs avail Item not on file Press ENTER or F8

Step 0

Fig. 62

| File | Vars | Host | Client | Misc. | Menu |
|------|------|------|--------|-------|------|

Declare New Variable
Variable: item_error

Inventory
Enter

1. Item #          15
   Warehouse                    Host

2. Type                                    Stocking Unit

3. Transaction date
4. Document #                              New qty avail
                                           New whs avail Item not on file Press ENTER or F8

Step 1

Fig. 63

| File | Vars | Host | Client | Misc. | Menu |
|------|------|------|--------|-------|------|

Clear Client Screen
Enable: Y

Host
―――――――――――――――――――

Inventory
Enter
1. Item #        15
   Warehouse

2. Type                          Stocking Unit

3. Transaction date
4. Document #                    New qty avail
                                 New whs avail Item not on file Press ENTER or F8

Step 3                    Fig. 65

| File | Vars | Host | Client | Misc. | | Menu |
|------|------|------|--------|-------|--|------|

Move Client Cursor
Row: 1
Col: 1

Host

Inventory
Enter
1. Item #  15
   Warehouse

2. Type                    Stocking Unit

3. Transaction date
4. Document #              New qty avail
                           New whs avail Press ENTER or F8

Item not on file

Step 4                                    Fig. 66

| File | Vars | Host | Client | Misc. | Menu |
|------|------|------|--------|-------|------|

Sound Tone at Client
Enable: Y

Host

Inventory
Enter
1. Item #           15
   Warehouse

2. Type                          Stocking Unit

3. Transaction date
4. Document #                    New qty avail
                                 New whs avail Item not on file Press ENTER or F8

Step 5

Fig. 67

| File | Vars | Host | Client | Misc. | Menu |

Send to Client
| | Type | Value |
|---|---|---|
| Data 1: | Variable | item_error |
| Data 2: | Special Char(s) | <cr> <lf> |
| Data 3: | Text | Press enter to |
| Data 4: | Special Char(s) | <cr> <lf> "continue:" |

Inven[tory]
Enter

1. Item #        15
   Warehouse

2. Type                              Stocking Unit

3. Transaction date
4. Document #                        New qty avail
                                     New whs avail Item not on file Press ENTER or F8

Fig. 68

Step 6

| File | Vars | Host | Client | Misc. | | Menu |

Declare New Variable
Variable: answer

Host

Inventory
Enter
1. Item #    15
   Warehouse
2. Type                           Stocking Unit
3. Transaction date
4. Document #                     New qty avail
                                  New whs avail Item not on file Press ENTER or F8

Step 7

Fig. 69

Step 8

| File | Vars | Host | Client | Misc. | Monitor |
|---|---|---|---|---|---|

Host

Inventory
Enter
1. Item #   15
   Warehouse
2. Type
3. Transaction date
4. Document #

Client

Item not on file
Press ENTER to
continue:

Item not on file

Press ENTER or F8

Step 9

Fig. 71

| File | Vars | Host | Client | Misc. | Menu |
|---|---|---|---|---|---|

Send to Host
　　　　　Type　　　　Value
Data 1:　　Variable　　answer
Data 2:　　<empty>
Data 3:　　<empty>
Data 4:　　<empty>

Invent
Enter

1. Item #　　　　　　15
　 Warehouse

2. Type　　　　　　　　　　　Stocking Unit

3. Transaction date
4. Document #　　　　　　　　New qty avail
　　　　　　　　　　　　　　　New whs avail Item not on file Press ENTER or F8

Step 10　　　　　　　　　　　　Fig. 72

| File | Vars | Host | Client | Misc. | Monitor |
|------|------|------|--------|-------|---------|

Host

Inventory
Enter
1.  Item #
    Warehouse

2.  Type                              Stocking Unit

3.  Transaction date
4.  Document #                         New qty avail
                                       New whs avail F1 = next entry   F2 = next item   blank = look up by description Step 11

Fig. 73

| File | Vars | Host | Client | Misc. | | Menu |
|---|---|---|---|---|---|---|

Select Link Destination
Path Name:   item_transfer
Index:       0

———————— Host ————————

Inventory
Enter
1. Item #
   Warehouse

2. Type                              Stocking Unit

3. Transaction date
4. Document #                        New qty avail
                                     New whs avail F1 = next entry    F2 = next item    blank = look up by description Step 11                              Fig. 74

TRAINABLE USER INTERFACE TRANSLATOR

BACKGROUND

This invention relates to integrating and translating software application user interfaces from a targeted computer system to a new computer system without modifying the underlying application.

Software developers, system integrators, value added resellers and end users are eager to utilize the leading edge handheld computers and portable data collection terminals. Yet, incorporating these new devices into existing software systems has proven difficult primarily because the computer system running the application must provide a user interface with a minimum functionality. For instance, an inventory system's user interface may require a screen capable of displaying 24 lines by 80 characters. Yet, a portable terminal may only provide 4 lines by 40 characters, and therefore be incapable of directly running the application. Since handheld or portable terminals typically do not provide the required minimum functionality, they are not capable of running most current applications.

The traditional solutions to this problem included rewriting the old application, buying a new application suited to the portable terminal restrictions, or writing a custom mapping program that would "map" the fields, prompts and responses from their respective positions on the targeted computer display to the more usable positions on the portable device. Rewriting the old application takes time, costs money and risks the introduction of bugs into the existing system. Buying a new application involves significant expense and risk.

Custom mapping programs are expensive and time consuming to create and increase the maintenance cost of the application as changes in the application program could require further changes in the custom mapping program. In addition, custom mapping programs can create synchronization problems. The need to synchronize becomes obvious when you think about the impact of an error message not being seen by an operator who continues to type ahead. Therefore, custom mapping programs are not a satisfactory solution to the problem.

The present invention solves this problem by acting as an intelligent trainable interface between an existing application and a new computer system. The result is that the present invention allows the use of existing computer software with hardware for which it was not originally designed. Specifically, it provides a means of interfacing with the existing program, processing the data from the display screens of that existing program and presenting these data to the user in a different manner and/or format. Similarly, it accepts data from the user, reformats the data if necessary, and presents the re-formatted data to the existing application.

One goal of the present invention is to provide a system that can translate or convert an existing software application's user interface, so as to operate on a new computer system. In addition, it is a goal of the present invention to provide a system that utilizes a simple scheme to educate or train the system to translate an existing software application's user interface. A further goal of the invention is to provide synchronization mechanisms to sync operation of a portable device to that of an existing software application. An additional goal of the invention is to provide robust error handling of application errors.

SUMMARY OF THE INVENTION

By means of this invention, existing application software may be utilized on a system which does not provide the required level of user interface functionality.

The invention discloses an trainable apparatus for translating an existing software application's user interface. The apparatus comprises a computer adapted to communicate with both a host computer and client computer. The apparatus intercepts the host computer's input/output stream and translates the application user interface into a client user interface for use on the client computer. The computer is additionally adapted to simplify user interactions with the application by hiding repetitive tasks and redundant information conveyed by the application user interface. The computer is further adapted to unify host applications into a single user interface.

A method of creating and training the apparatus is also disclosed. The apparatus is trained by the monitoring of a user's interaction's with the application. The monitoring process creates a path history utilized by the apparatus for translating the application user interface.

DETAILED DESCRIPTION OF THE PREFERRED EMBODIMENT

Figure 1:
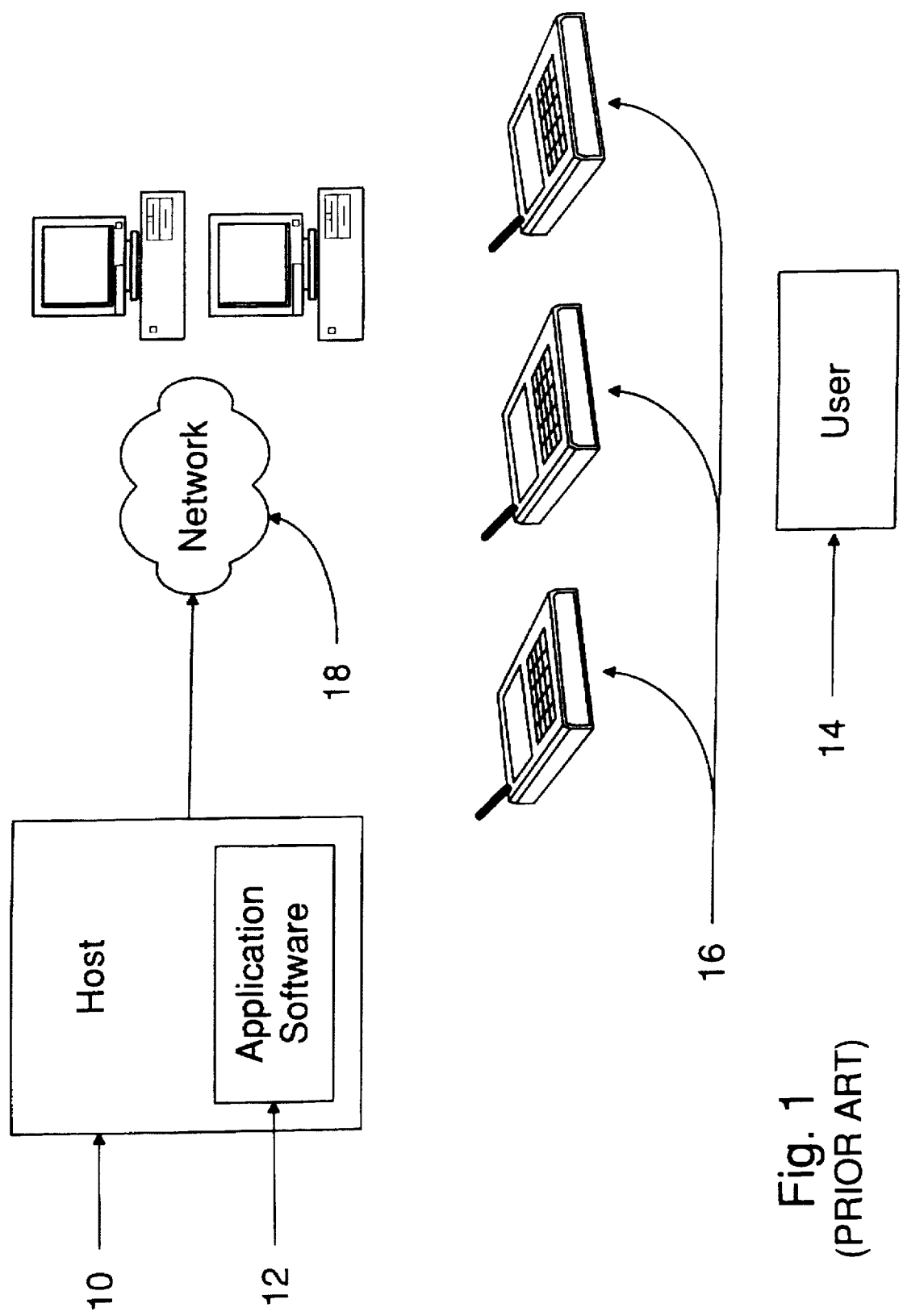
FIG. 1 is a block diagram of a prior art computer system utilizing handheld or portable terminals.

FIG. 1 shows a prior art computer system using a portable terminal. A computer system 10 runs an application 12 specifically designed for a portable terminals 16. This application 12 interacts with the user 14 through the portable terminal 16. The application 12 communicates with the portable terminal 16 through a communications medium 18 such as infrared, radio frequency or even direct wire. The portable terminal 16 displays to the user 14 prompts requesting specific information. The user 14 enters replies into the portable terminal 16 in response to these requests.

Figure 2:
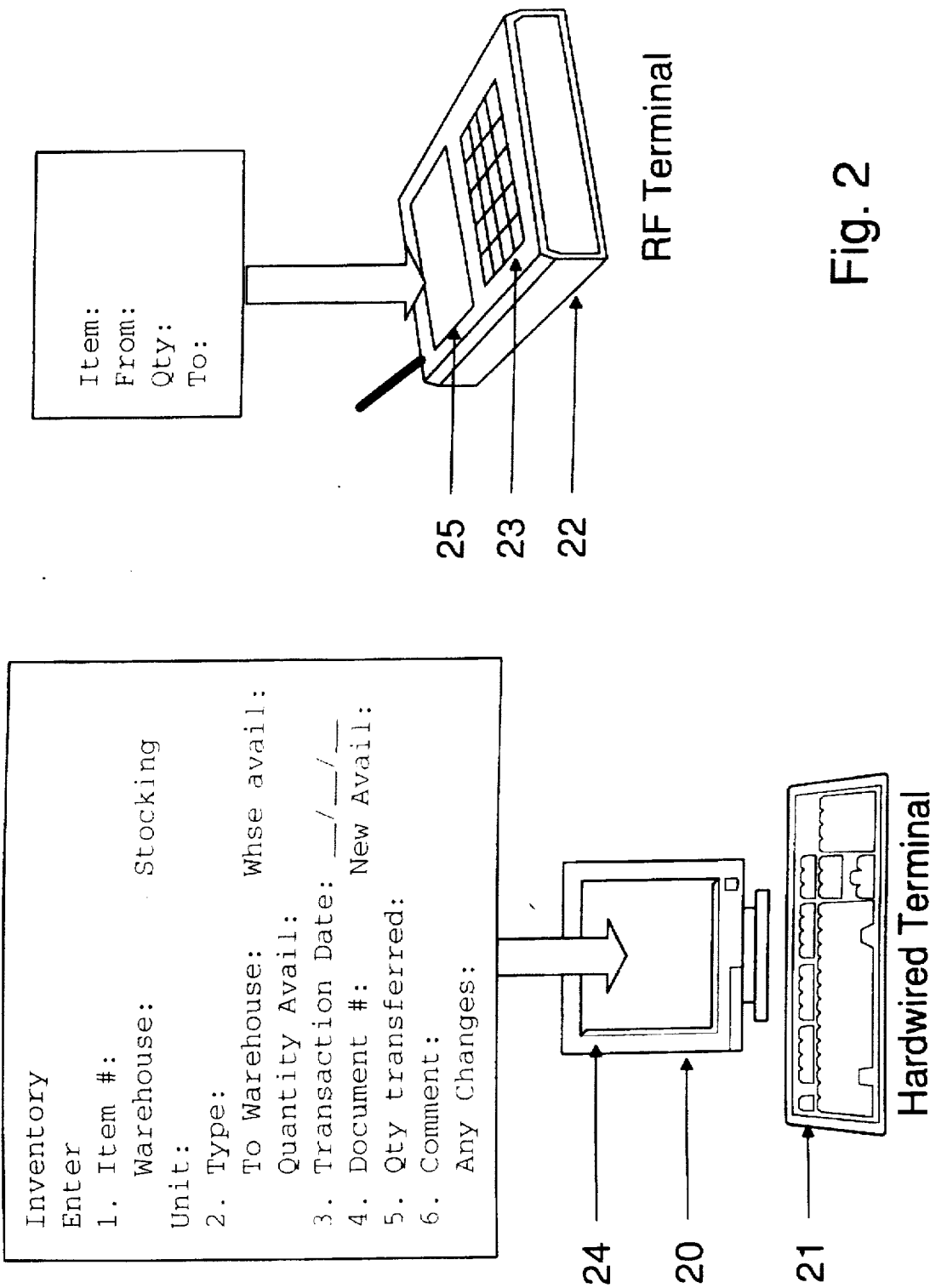
FIG. 2 is a diagram illustrating the functional difference between a portable terminal and a terminal targeted by the application.

If the application program is not designed to run on the portable terminal, the user will be unable to interact with the application. For instance, referring to FIG. 2, the application may require a terminal 20 with a full size keyboard 21 including functions keys, which keyboard is different from the keyboard 23 available on the portable terminal 22. The application may also require a terminal 24 whose screen size is larger than the screen 25 on the portable terminal 22. In either situation, the application will be unable to run on the portable terminal without some form of change to the system.

Figure 3:
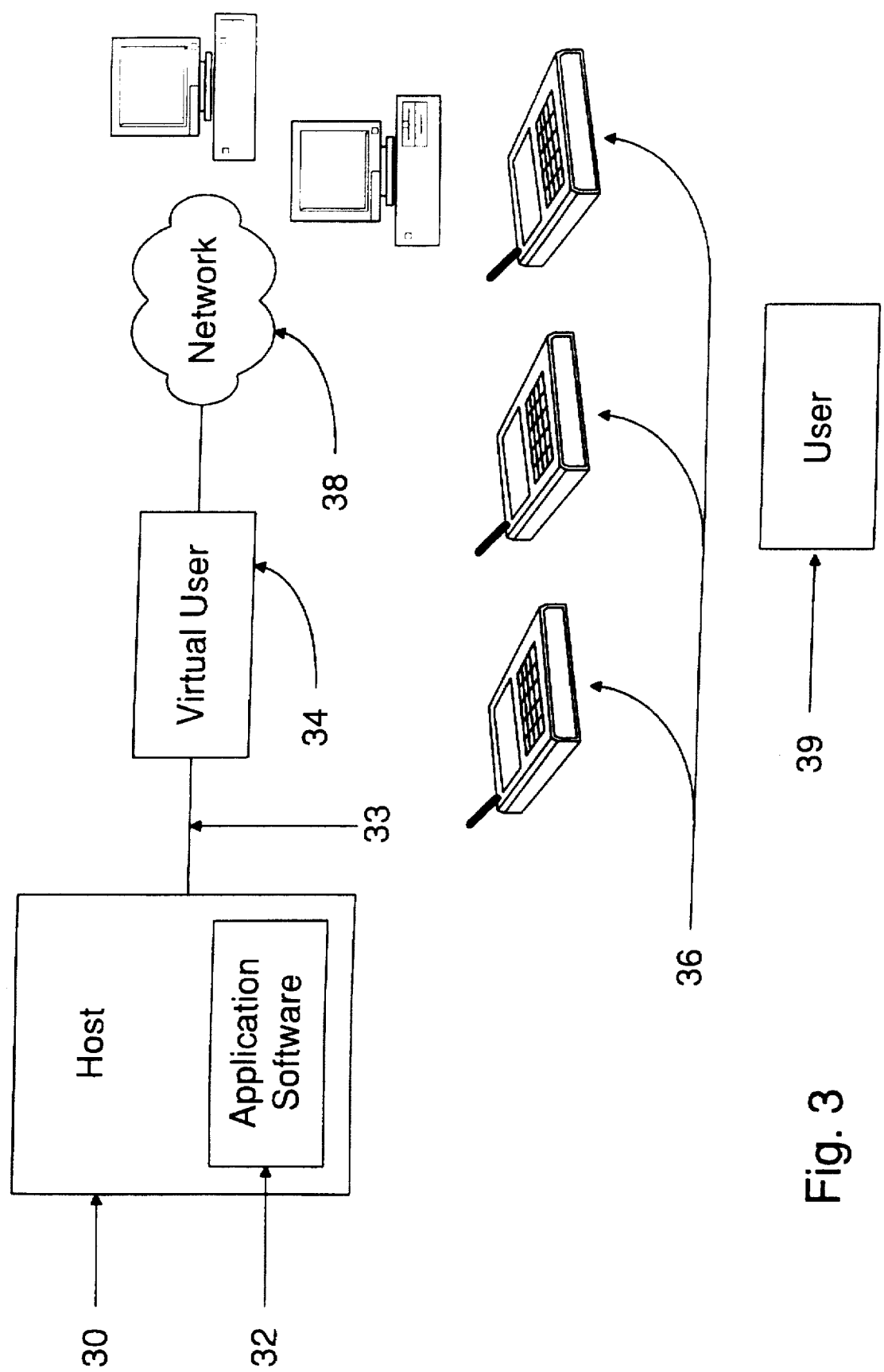
FIG. 3 is a block diagram of a computer system utilizing the invention to interface to portable terminals.

FIG. 3 shows a computer system utilizing the present invention. A computer system 30 runs an application 32 that is not designed for use with a portable terminal. The present invention 34 is interposed between the application 32 and the portable terminal 36. The application 32 communicates through communications medium 33 with the present invention 34 which in turn communicates with the portable terminals 36 through a communications medium 38. Again, the portable terminal 36 displays to the user 39 prompts requesting specific information, but these prompts are generated by the present invention 34 and not the underlying application 32. The user 39 enters replies into the portable terminal 36 in response to these prompts, but these replies are again captured by the invention 34 and not necessarily passed directly to the application 32.

The present invention may reside on the same computer system as the underlying application program or may reside in a separate computer system and communicate with the application program through a network. In either situation, the present invention intercepts the I/O stream and translates the user interface for use on the portable terminal. The present invention may also be used to simplify access to an existing program or group of programs even though access is through the same computer system as that of the existing program(s).

In order to interface and translate between an existing application and a portable terminal, the present invention creates a Virtual User (VU). A VU appears to the existing application as a real user. The VU is trained to operate the existing application, just as a real user would, and to present data to the real user in a format compatible with a portable terminal.

The VU is created, prior to use in the final system, by monitoring the interactions of a human user while operating the application. In the background, the present invention is creating a "path file" that the VU will use to automatically navigate through the particular task in the application. The path file consists of a series of automatically generated "steps" created during the training process that the VU later executes in a linear or branched sequence so as to move around the application. Every cursor stop in an application is reviewed by the VU and at least one step, possibly a series of steps, is associated with the stop.

The present invention provides three features to facilitate the creation of the VU. First, the present invention utilizes a menu driven interface to facilitate the process of creating the VU, making the process interactive as opposed to "off line". The user is not required to program in the classical sense, but rather just to interact with the application.

Second, the VU can create and utilize functions not available on the underlying application. Because the present invention is simply following a pre-defined set of steps, any combination of keystrokes a person can enter, a VU can also. This allows the VU to be trained or educated to navigate around the entire application, enter and exit different applications, and even access and exit different hosts. For example, an application may have two menu options: the first menu would list the quantity of item on hand and second menu would list the location of item. A typical user directly accessing the application would have to enter the first menu option to get the quantity, exit the first menu option, enter the second menu option to get the location just to get both pieces of information. The VU can be trained to do the same steps but present the user with one screen that has both pieces of information. Therefore, the present invention can create new functions for a user that were not previously available by running a particular application, "straight through as written".

Third, the present invention provides streams monitoring that allows the VU to synchronize itself with the application. The VU must be synchronized with every application cursor stop prior to sending any keystrokes back to the host. The use of streams monitoring allows the VU to "recognize" the current cursor position and hence determine on what screen of the application it is "looking at".

Creating and Educating the Virtual User

In order to translate an applications user interface, the VU must be created and educated.

The following is a list of all the commands accessible from FILE, VARS, HOST, CLIENT and MISC selections of the menu bar i\of the present invention during the education process.

| FILE MENU | |
| --- | --- |
| Save path File | save the steps that you have created to the path file, without exiting |
| Save & Exit | save the path file and exit |
| Quit | exit without saving |
| Save Window | allows you to save the image of any screen for later printing |
| VARS MENU | |
| Declare Variable | declare a variable to be used in the path file you will create |
| Set Variable | initialize a variable already declared to a starting value |
| Branch on Variable | define the path name the program will branch to when a variable equals the "to match" filed defined here. NOTE: "No." selects the step # in the path. |
| HOST MENU (first time) | |
| Connect Local (PTY) | defines connection method to host application as pseudo terminal access to the same computer the VU is running on. |
| Connect Local (Pipe) | defines connection method to host application is via a pipe to the same computer the VU is running on. |
| Connect via TELNET | defines connection method to host application is via telnet, in this case the application is running on different computer than the VU. |
| Connect via Serial | defines connection method to host application is via a serial port on the computer the VU is running. |
| HOST MENU | |
| Send to Host | send any combinations of keystrokes to the host |
| Wait for Host | synchronization step that makes sure the VU and the host application are at the exact same character of a given application at a given time |
| Save Host Screen Data | save a particular window of the host screen, often used to store error messages that appear on the same line of the screen every time. |
| Bypass Virtual User | allows you to stop the interactive training and key data directly into the host application. |
| CLIENT MENU | |
| Clear Screen | send the command sequence to clear the screen |
| Sound Tone | send the command sequence to sound the bell tone |
| Move Cursor | send the command sequence to move the cursor to a specific x, y coordinate of the Client screen |
| Send Message | send a string of characters to the Client for display |
| Get Reply | request a reply from the Client (Scanner or keyboard input) |

-continued

| MISC MENU | |
|---|---|
| Start New Path | defines the current step as the beginning of a path, used as the connection point when using the connect statement below. |
| End Path | defines the end to a path |
| Connect (Loop) | allows program flow to be redirected to a path label specified using the "Start New Path" option above. |
| Exec Procedure | allows program control to pass to a pre-defined procedure, procedures are available for Terminal Mode, Logon, etc. |

By selecting various options from the menu bar defined above, one can access the application for which the VU will be trained. After accessing the application, one can interactively train the VU to react appropriately to prompts in the application.

An important concept is application program flow. Application program flow is the sequence of data input prompts that must be followed for use of a particular application. These prompts include menu selections, data and time entries, and other inputs as is required in order to operate an application. The present invention provides a method of pre-defining and remembering how someone interacts (e.g. a Virtual User) with an application.

The first step for a person using any application is to be trained on how to interact with the application. The VU, however, can be trained to remember keystroke sequences that are repetitive, access system time and date information—never forgetting how to do it. The VU must be trained on how to react to cursor stops that an application makes. After being trained in how to react to the cursor stops/prompts, the VU will be able to operate the same functions in the application by itself.

To facilitate data input, the VU must be trained to prompt for Client data input. Clients are the terminals (RF handhelds, regular terminals, etc.) where an operator will enter data. The VU simplifies the operation of an application without requiring any programming changes in the application. The VU does this by automating the majority of the application cursor stops/prompts and only passing through to the Clients that information required for the particular task at hand. At each cursor stop in the application there is the option of prompting Clients for data or doing any of the other functions the menu bar allows. This option allows the VU to vary its response to a given application cursor stop. In this way, the present invention ensures that the can branch in the execution of steps.

The following is a list of the basic steps of a typical Virtual User training session.

1) Host Connection/logon/application access
2) Client Menu
3) Host application access
4) Automated navigation through access menus
5) Prompting for Client data input
6) Branching and error instruction based on Client data
7) Looping to start the Client task over again or returning to a Client Menu By repeating these parts for whatever function you are trying to perform you can create simplified user input screens for the portable terminal operators. Because the VU is simply navigating through an application the same way a person would only at 66 MHz (the clock speed of the computer) you can train it to do tasks that you would not expect a person to be able to perform in a timely manner. This simple concept allows you to put together functionality from several menu options of an application (even several different applications) and create a single operator screen that might not even exist in the original application.

Figure 5:
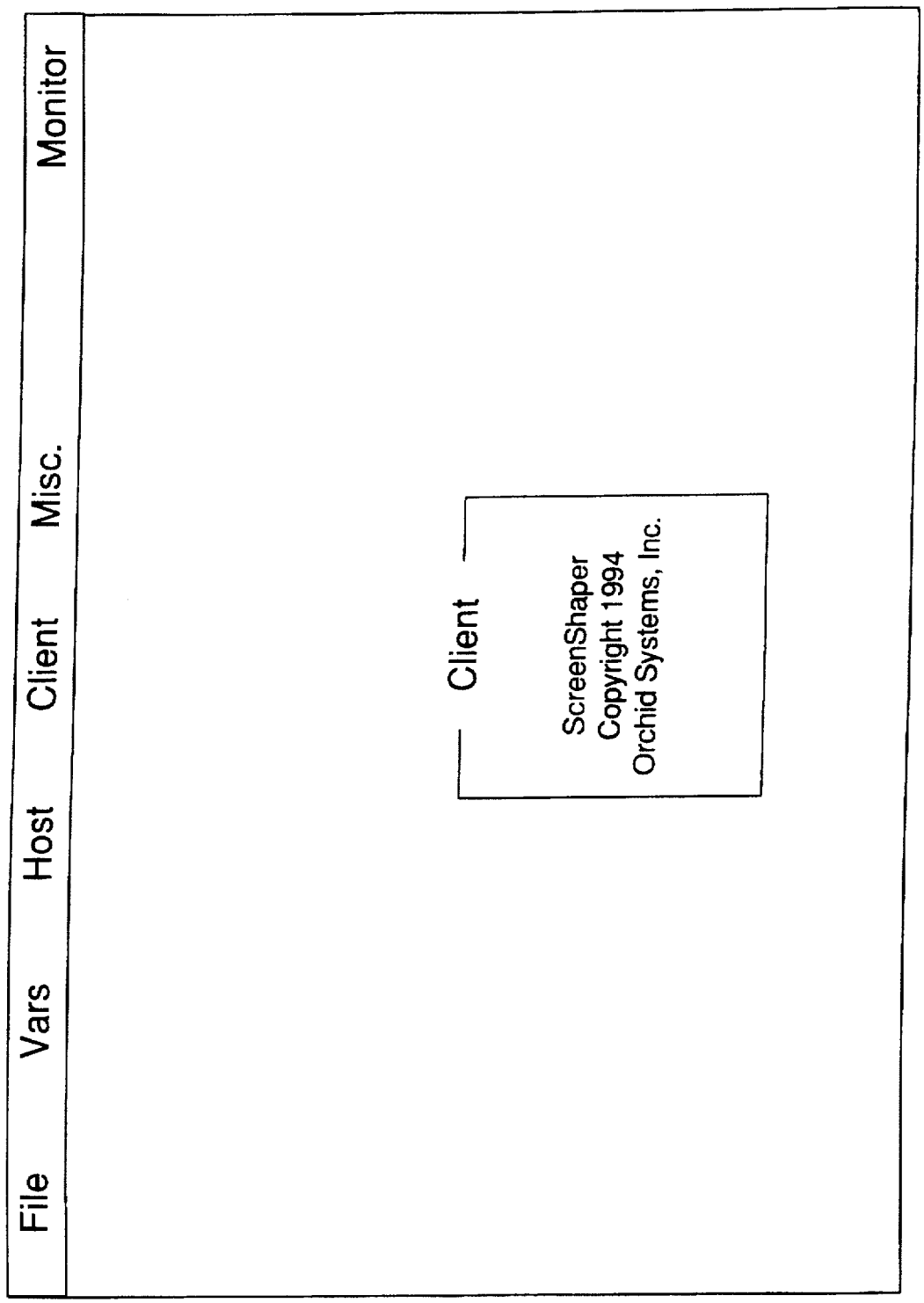
FIGS. 5–75 are screen printouts of one embodiment of the present invention.
Figure 6:
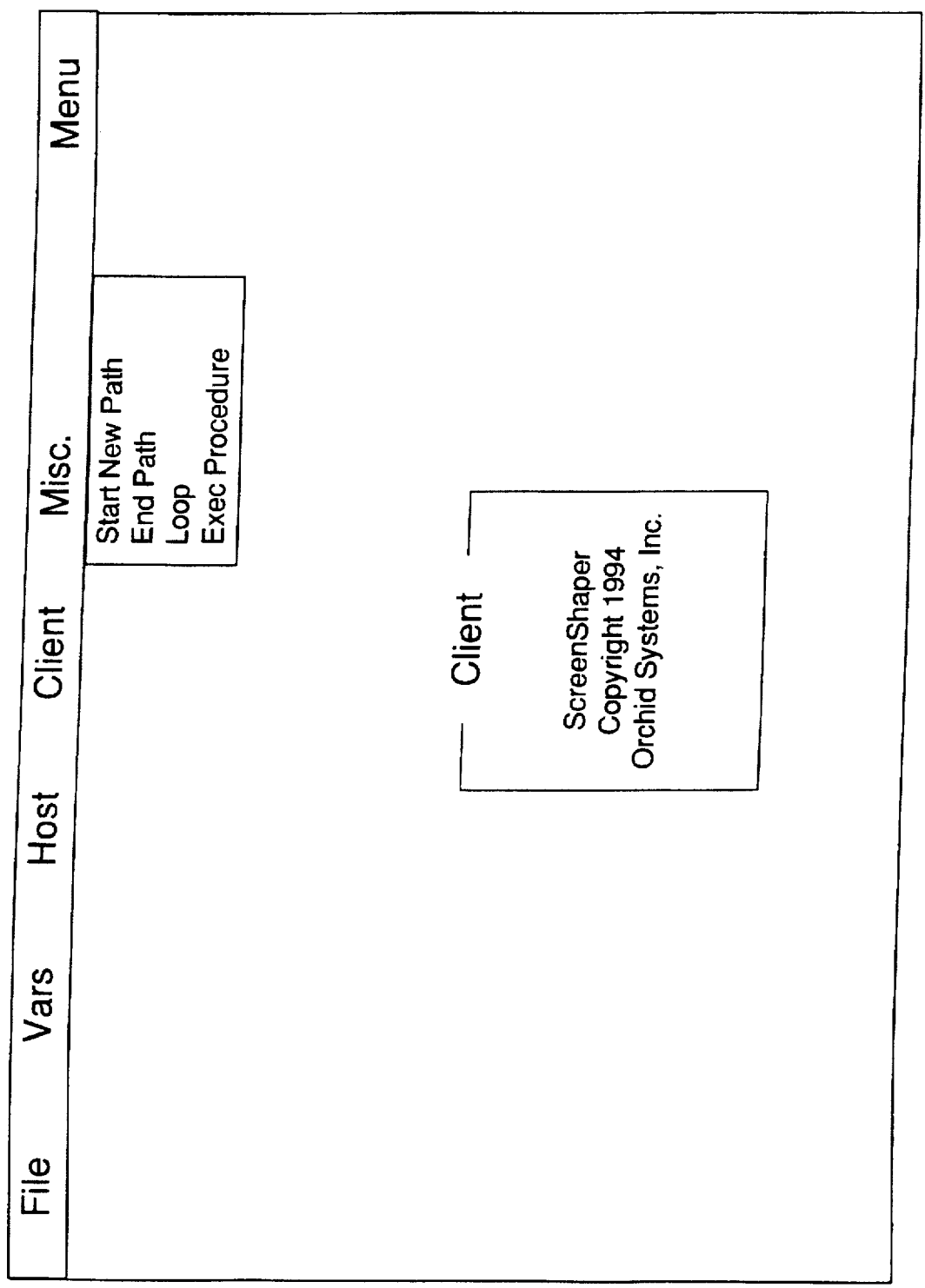
Figure 7:
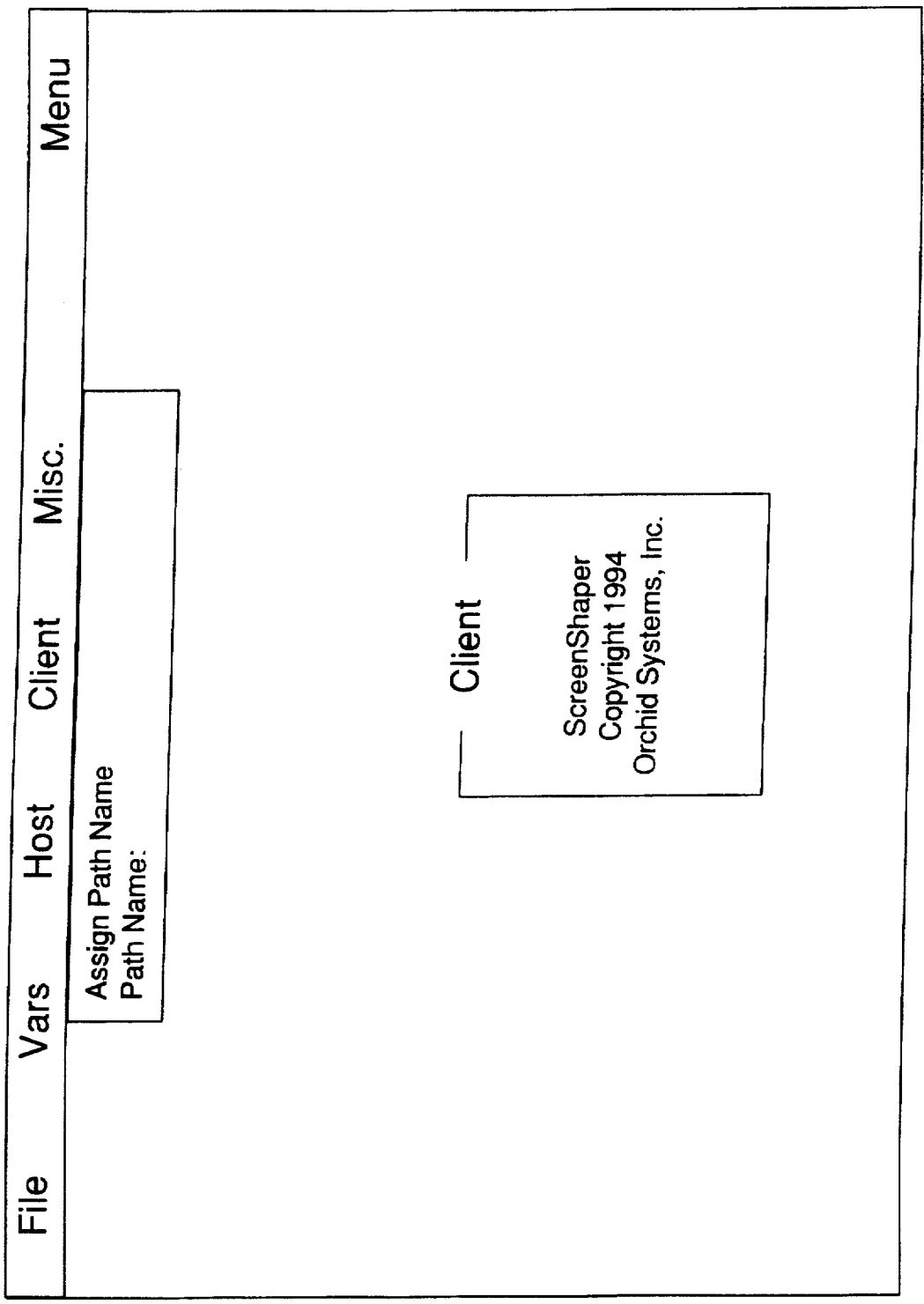
Figure 8:
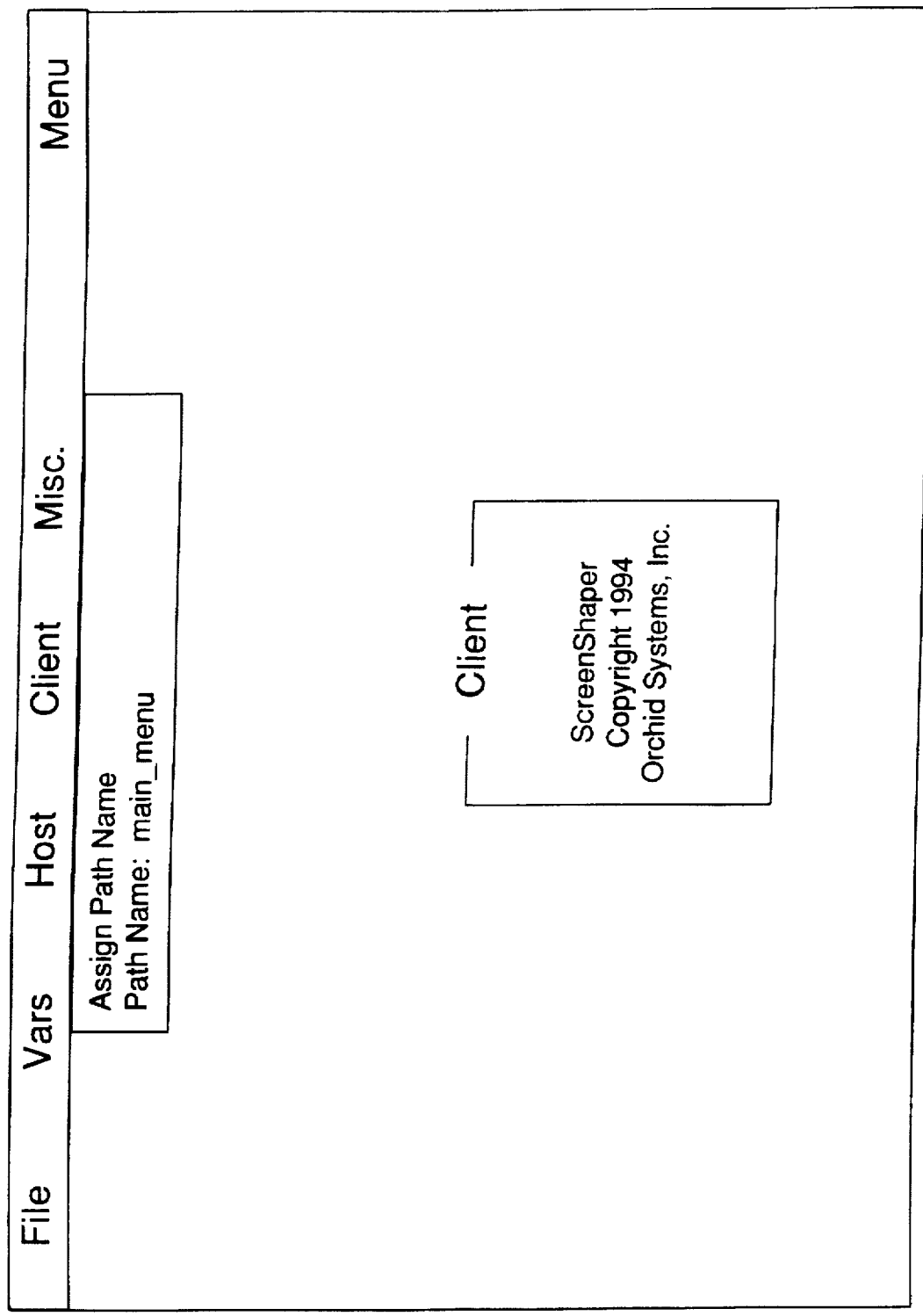

The details of each of these steps will become more clear through the following example training session. Note that the figures referred to in the example below show three important areas. Each figure represents the training screen of the present invention. At the top of the figures is the menu bar used to access the function menus describe above, as illustrated by FIG. 5. In the middle of the figures is a model Client window labelled "CLIENT", reflecting the size and shape of the screen on the Client computer system, as illustrated by FIG. 5. This screen is defined in the Spec file. An example Spec file is included as Appendix B. Finally, a "Host window shade", labelled "HOST", will pop up as needed to show messages and prompts sent by the host. This is illustrated by FIG. 32. The CLIENT, HOST and invention menus show the state of the system during the education process. When the education process is finished, the completed VU will operate as trained.

Example Virtual User Training/Education Session

The following is a simple application example as run by an actual user to illustrate the creation of a VU. Throughout the following text [] are used to represent selections that are to be selected using the pull down menus or to represent actual keys to press. For example: select [Start New Path] means to highlight the selection "Start New Path" in a pull down menu, press [end] means to press the end key.

Step 0: FIGS. 5 through 8

Access the Misc. menu and select the [Start New Path]. You must define the name of the path you are starting, this is important for looping and branching control. The path name specifies the point in the path for branch and loop access. In this example the name [main_menu] has been selected since this is the point at which the main menu will be displayed.

Figure 9:
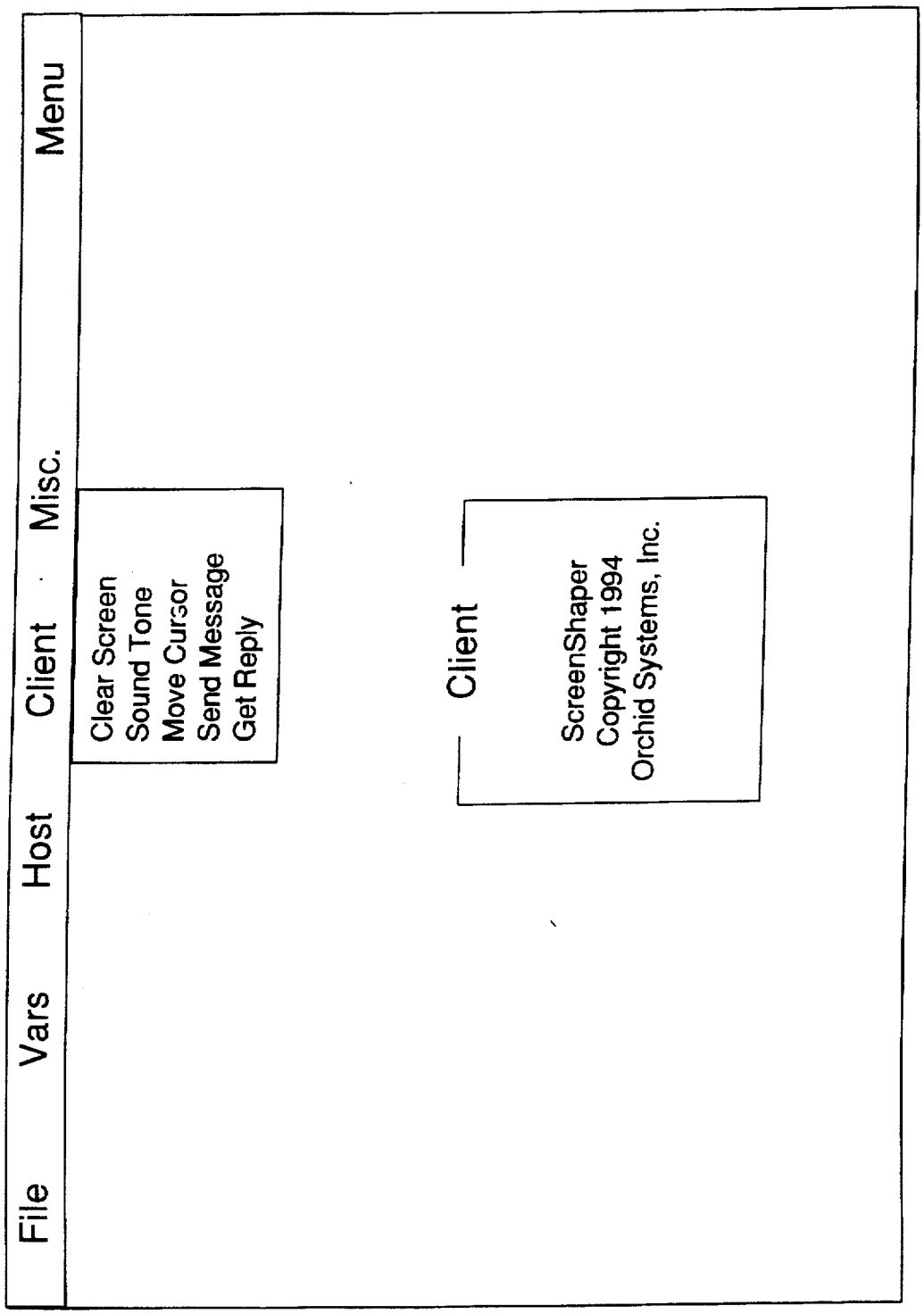
Figure 10:
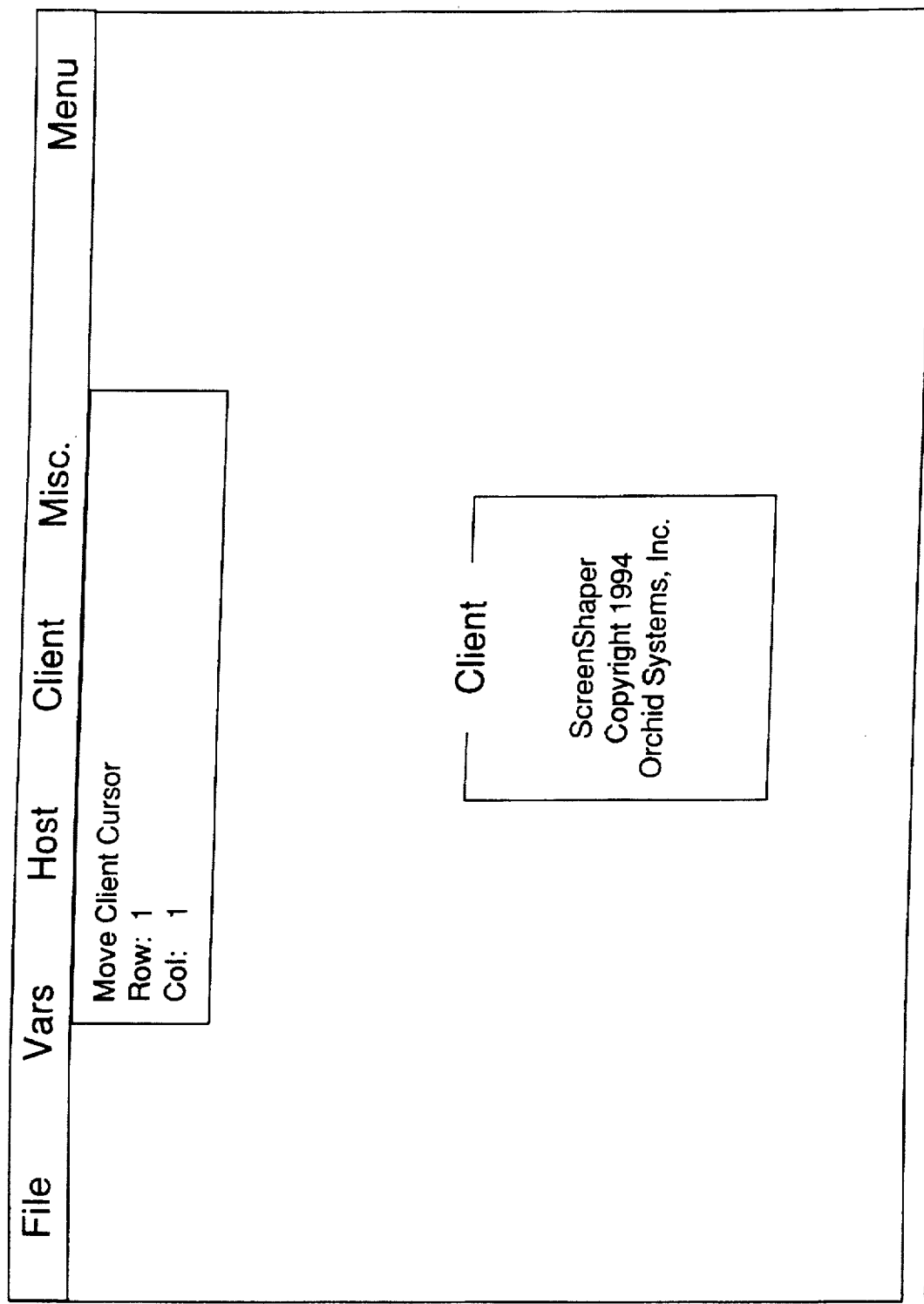

Step 1: FIGS. 9 through 10

Access the Client menu and select [Move Cursor]. This will set the cursor position in the client window. The default settings of row: 1 and col: 1 are have been selected. The cursor in the client window moves to the x,y position or 1,1 as a result.

Figure 11:
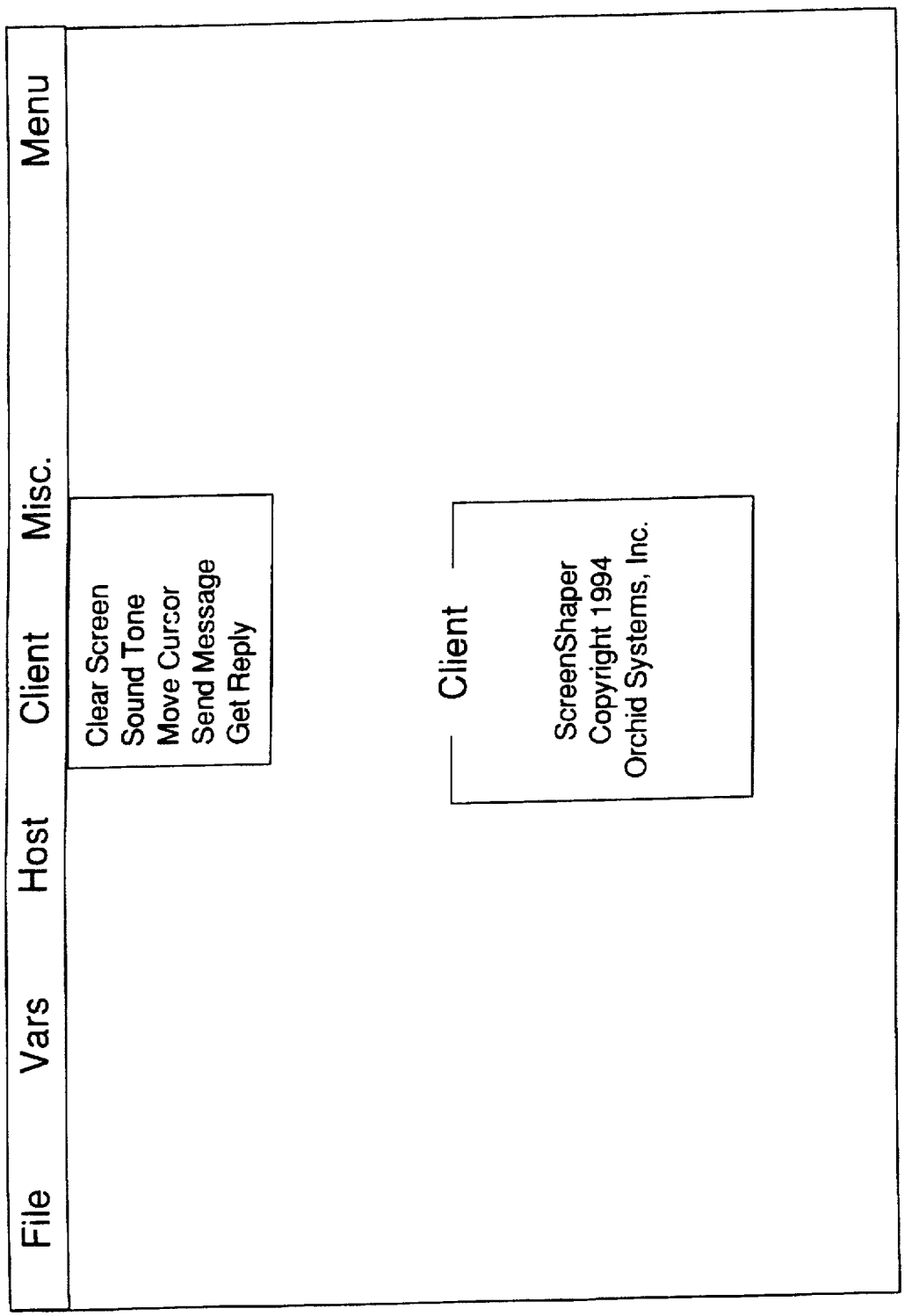
Figure 12:
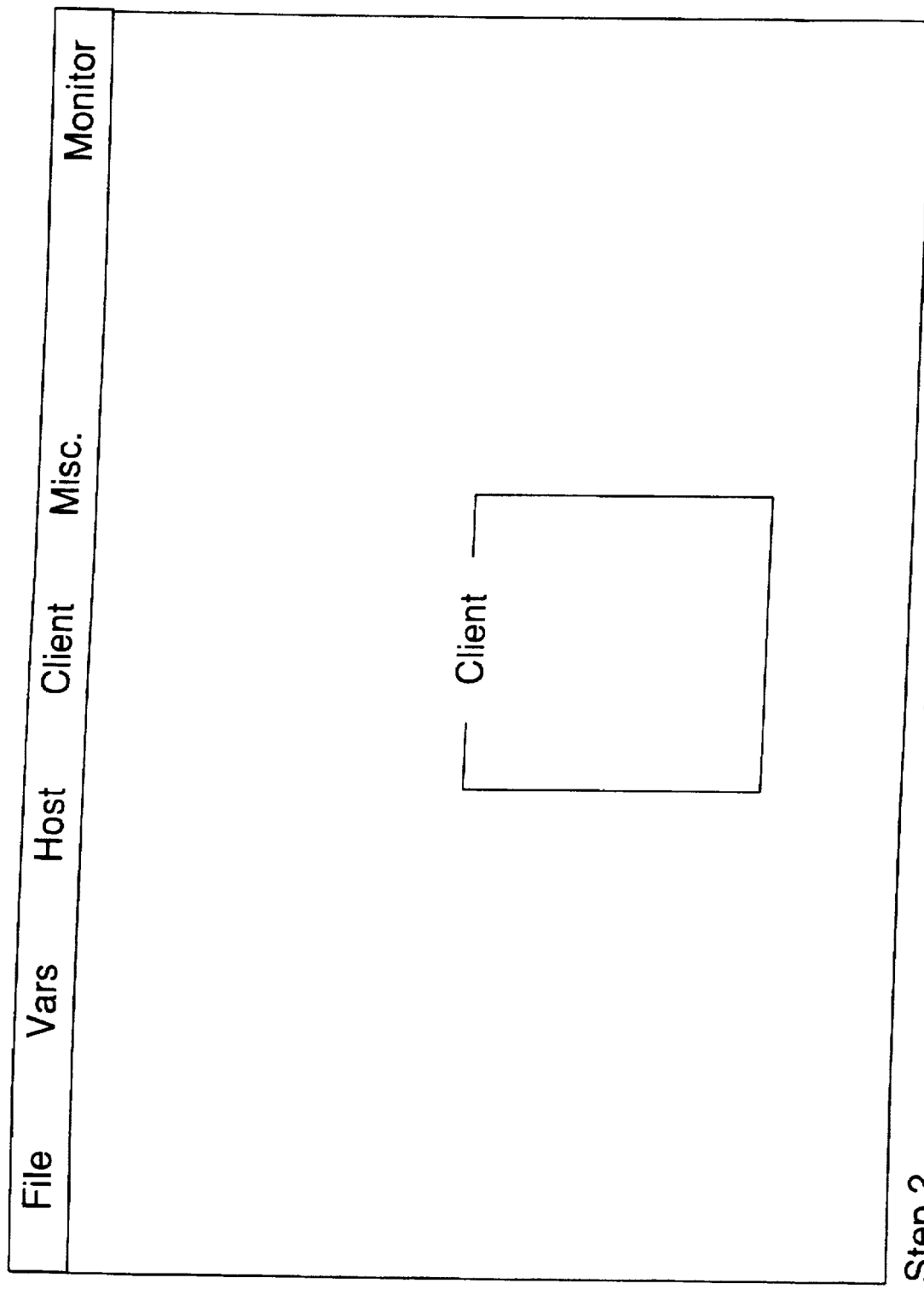
Figure 13:
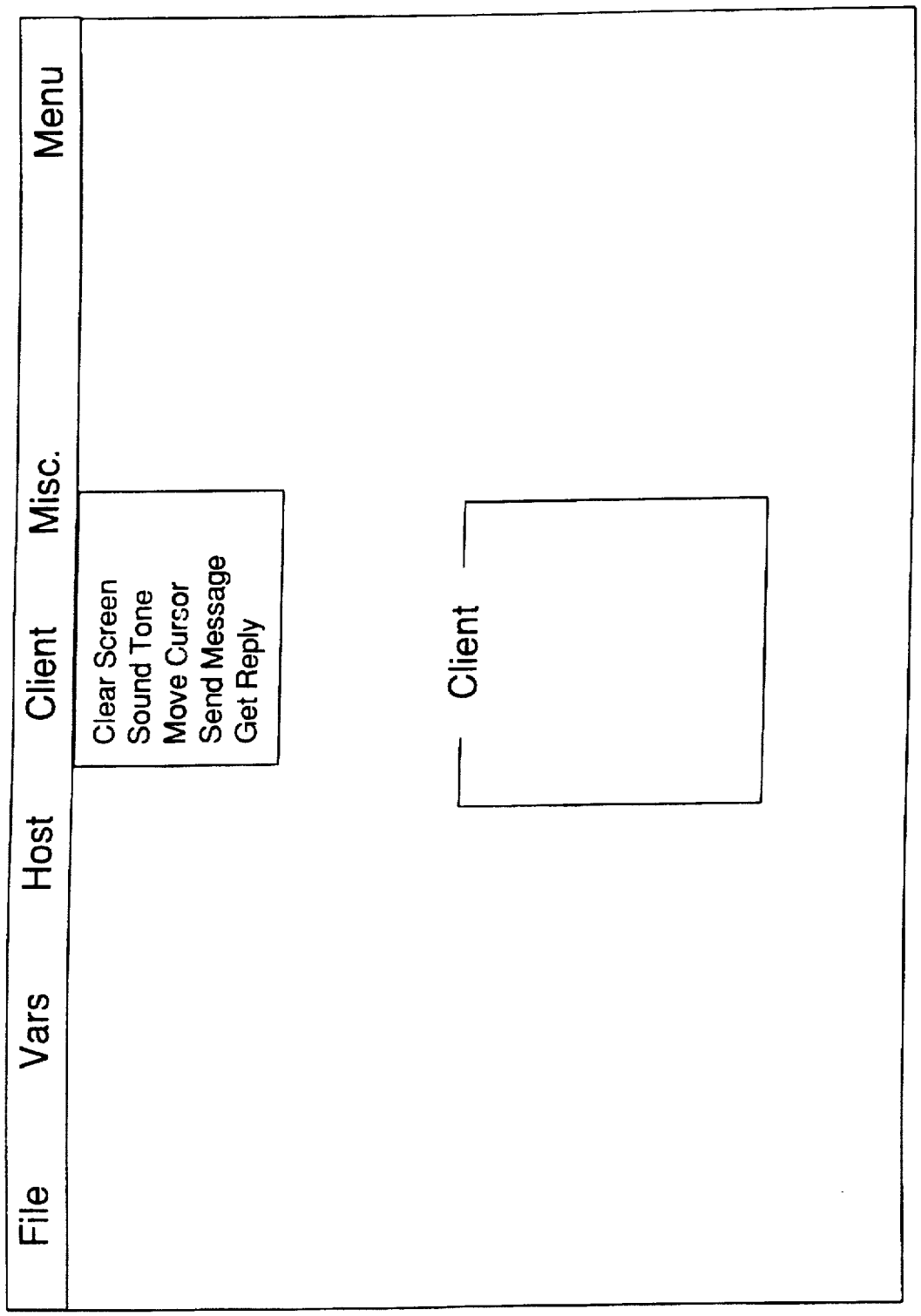
Figure 14:
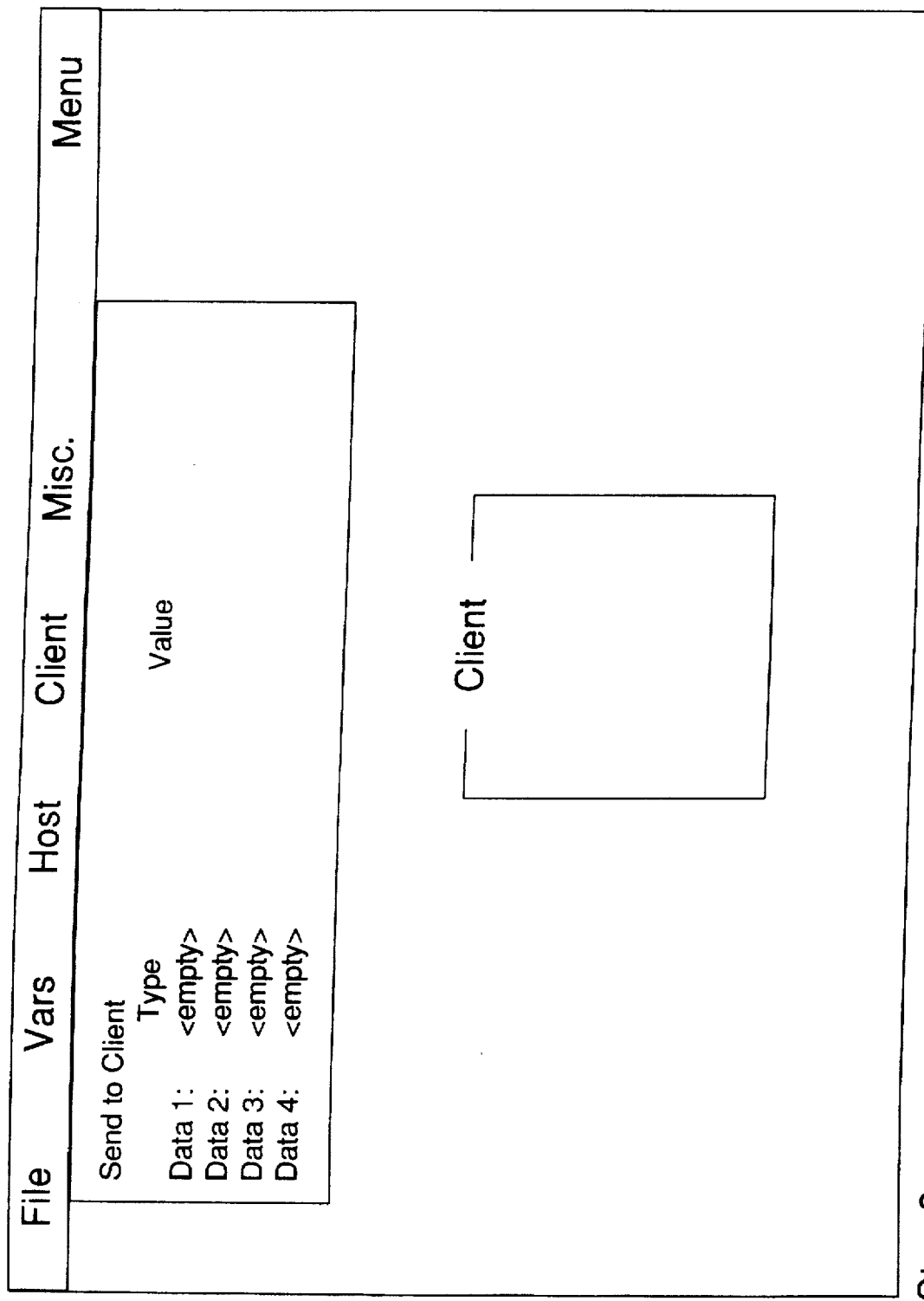
Figure 15:
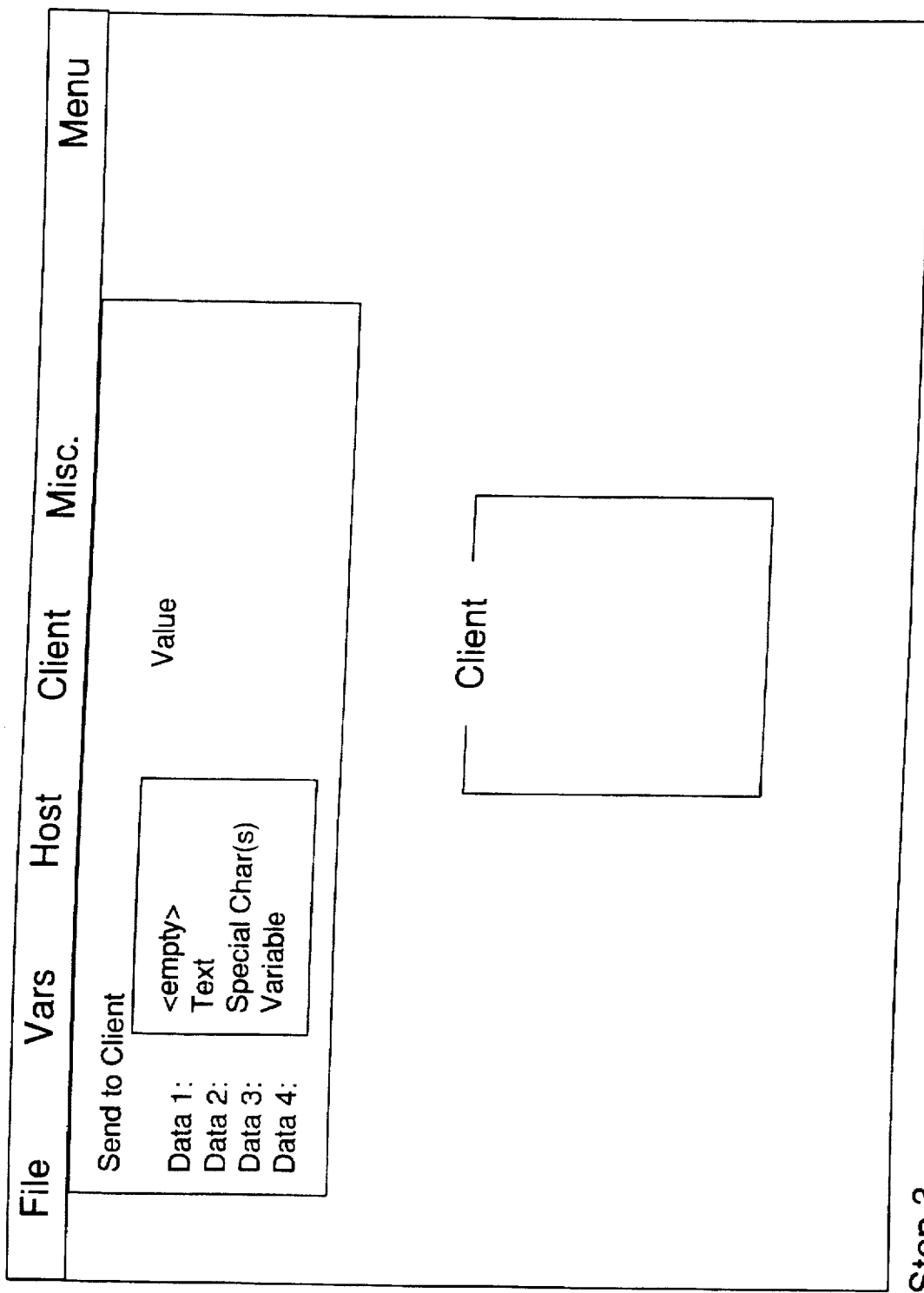
Figure 16:
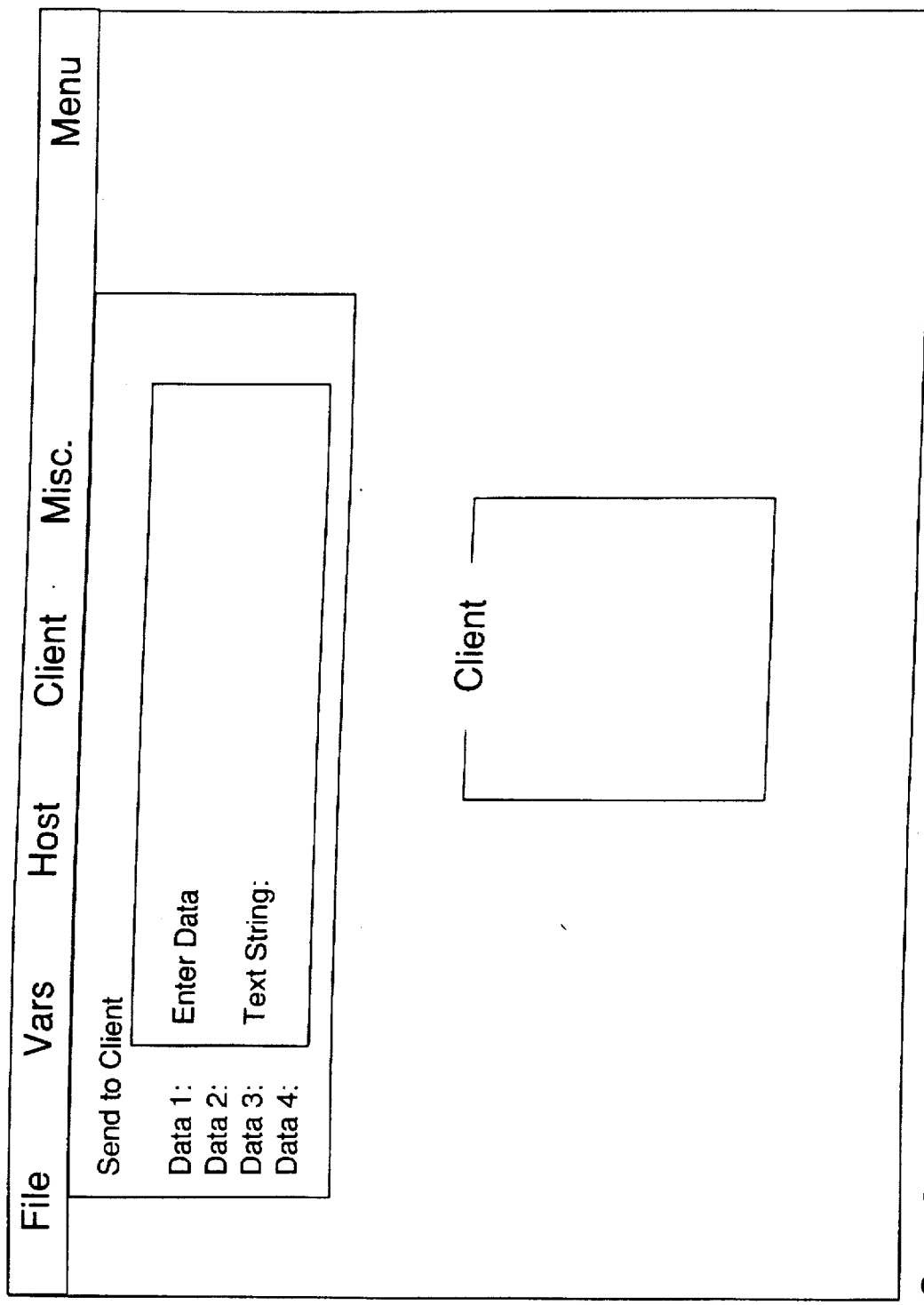
Figure 17:
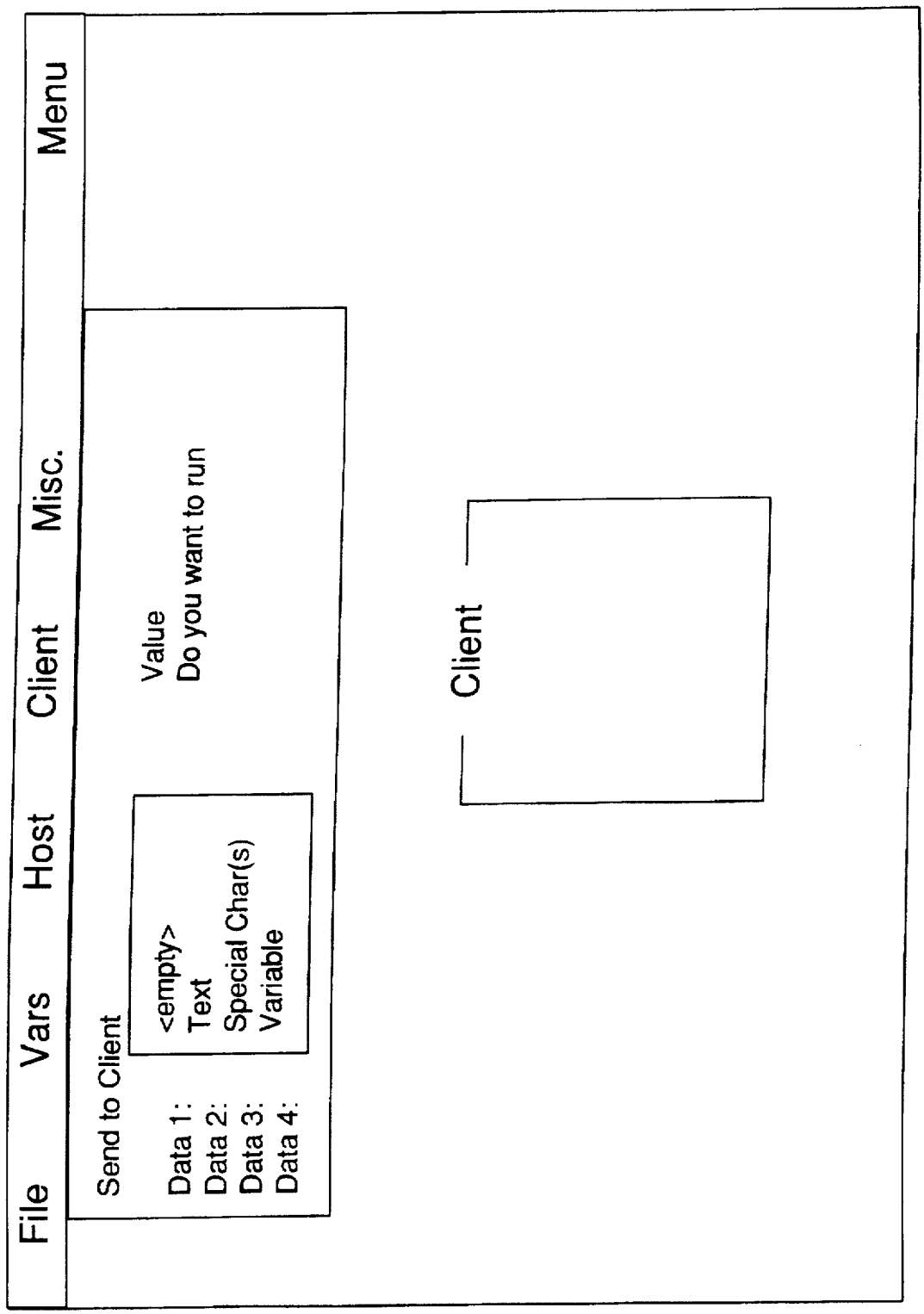
Figure 18:
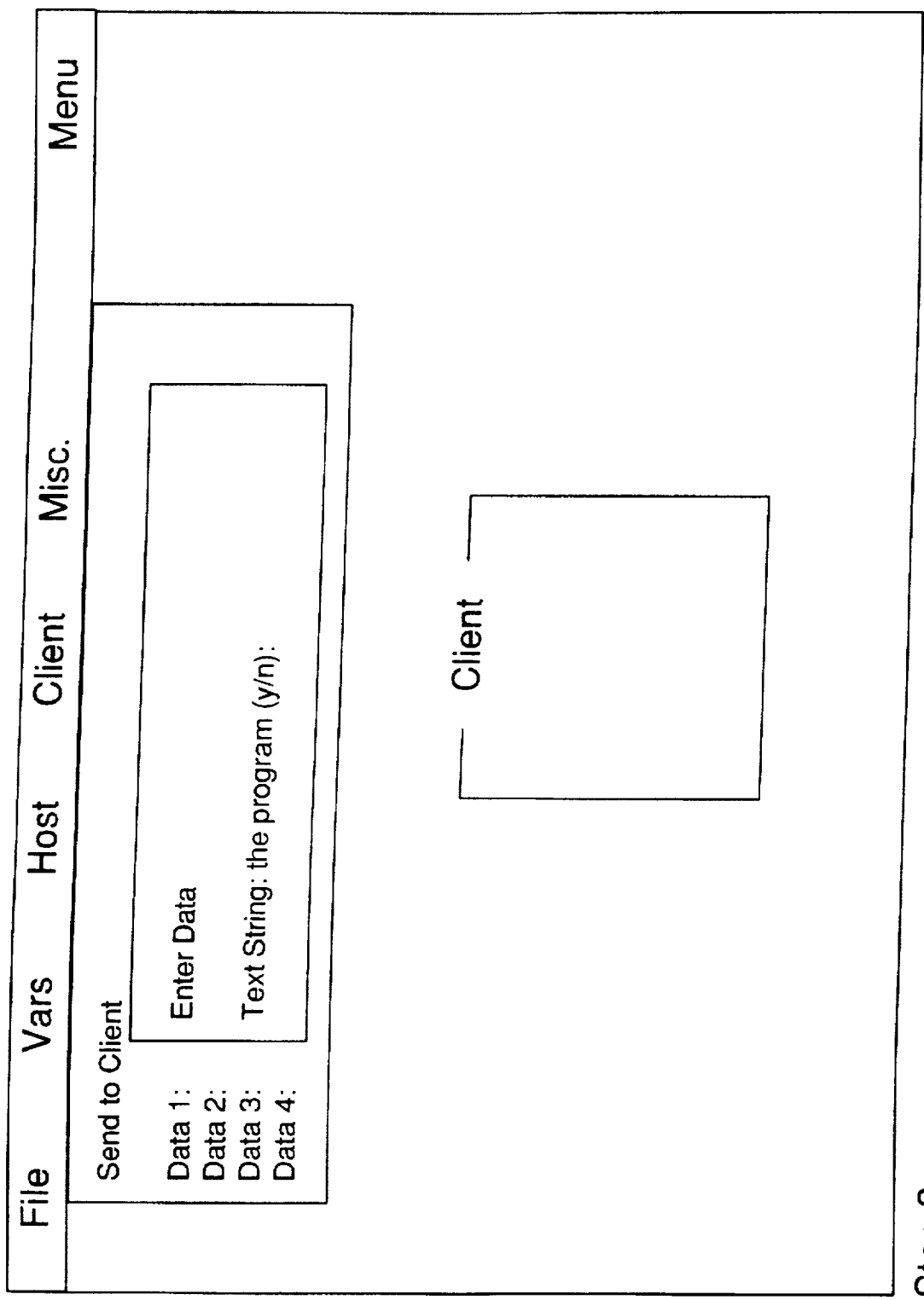
Figure 19:
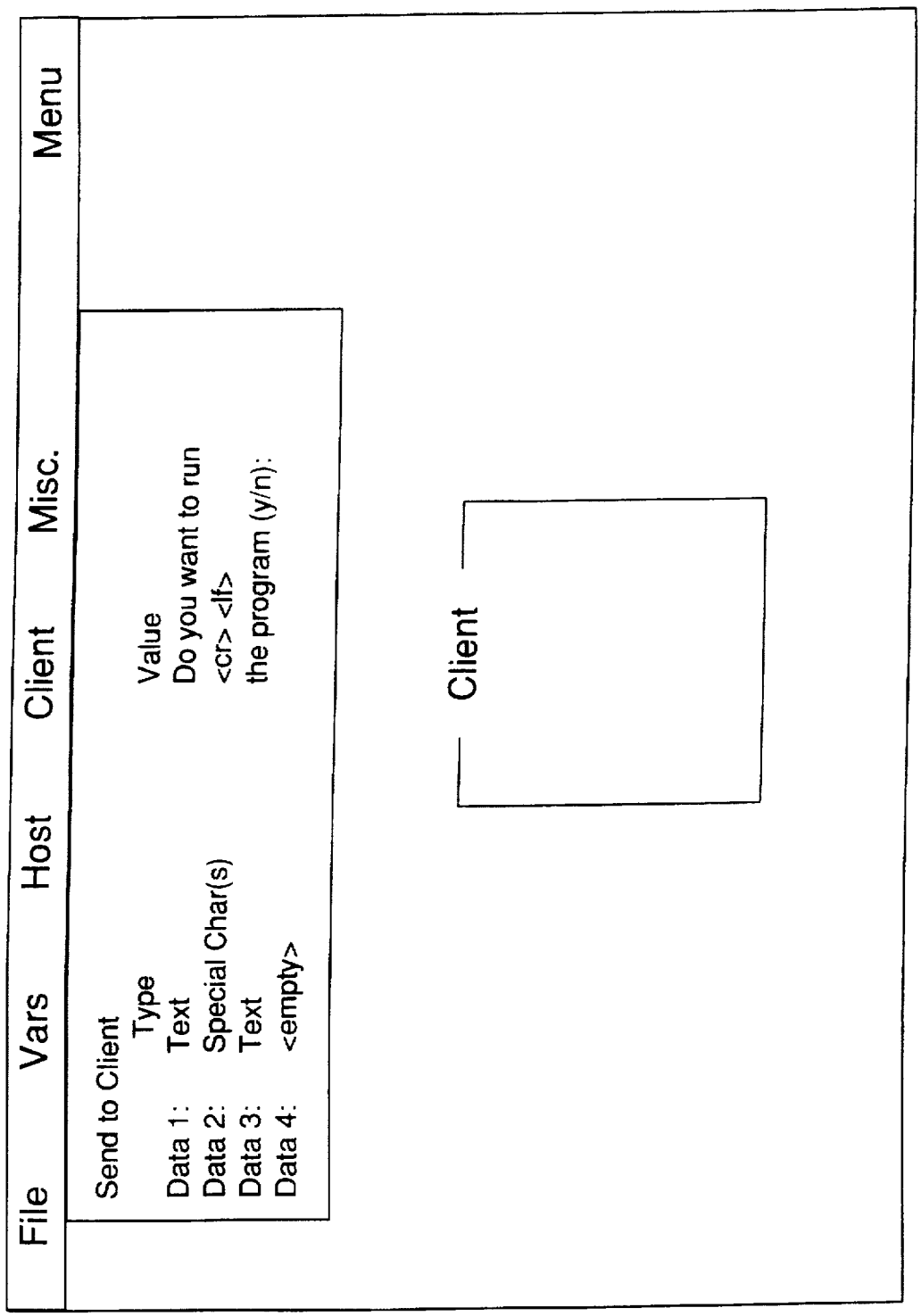
Figure 20:
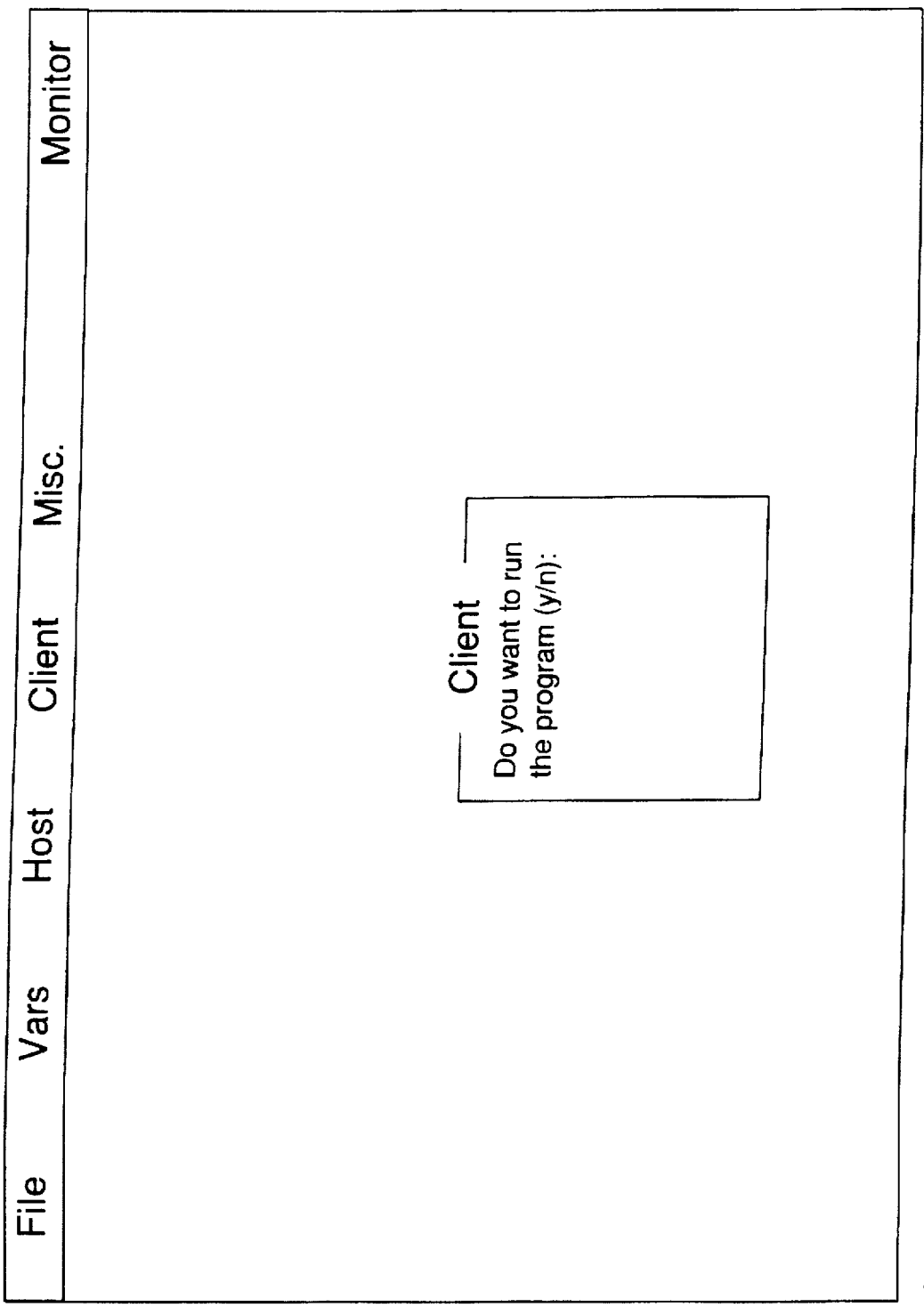

Step 2: (FIGS. 11 through 12)

Access the Client menu and select [Clear Screen]. The client screen is cleared as a result.

Step 3: (FIGS. 13 through 20)

Access the Client menu and select [Send Message]. A submenu is displayed. Access the Type submenu and select [Text] and enter the message to be displayed on the client screen. In this example the message [Do you want to run the program y/n] is entered. The text "Do you want to run the program y/n" is now displayed on the client screen, split into lines of length appropriate to fit on the Client screen. The system is now ready to get a reply from the client.

Figure 21:
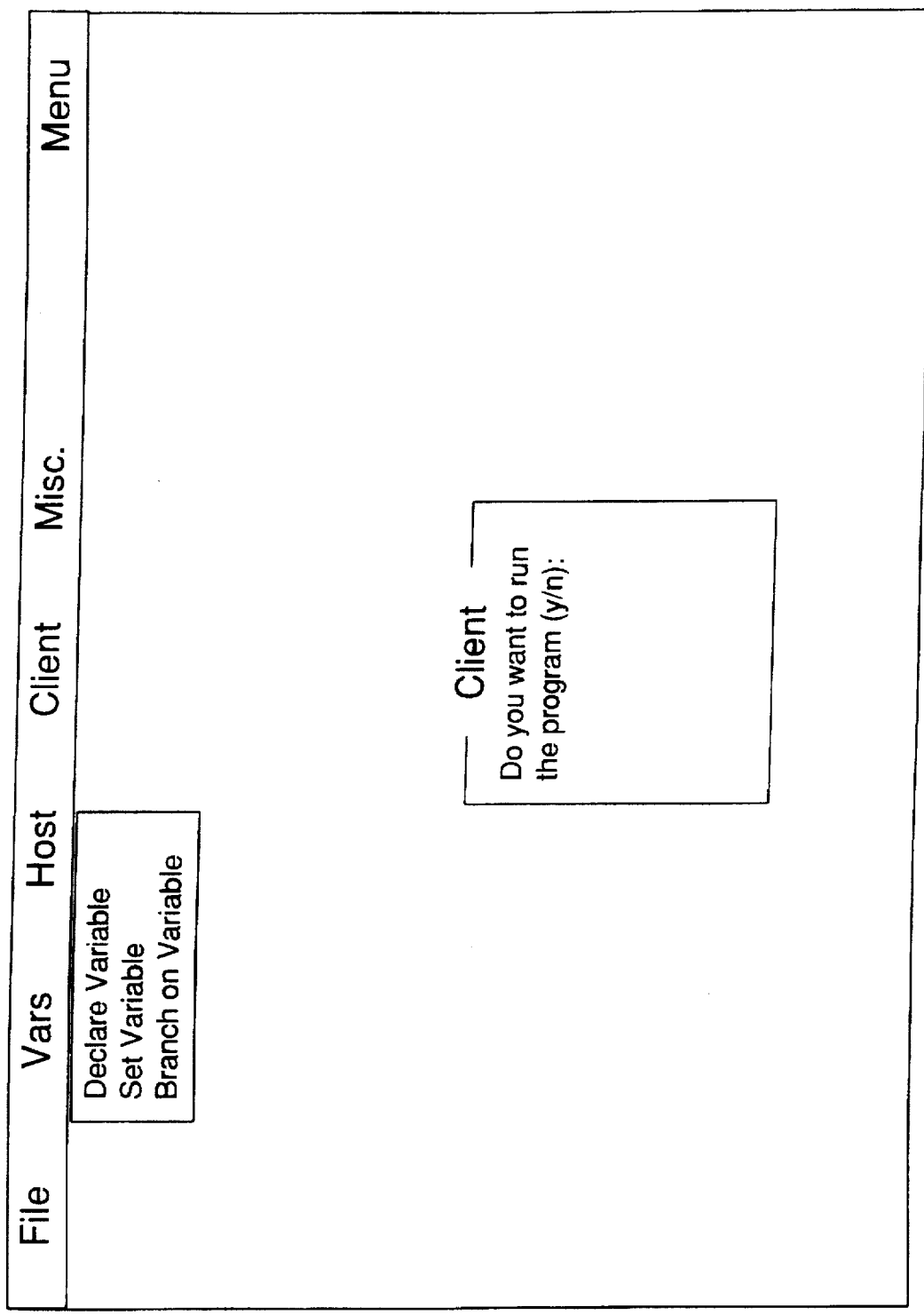
Figure 22:
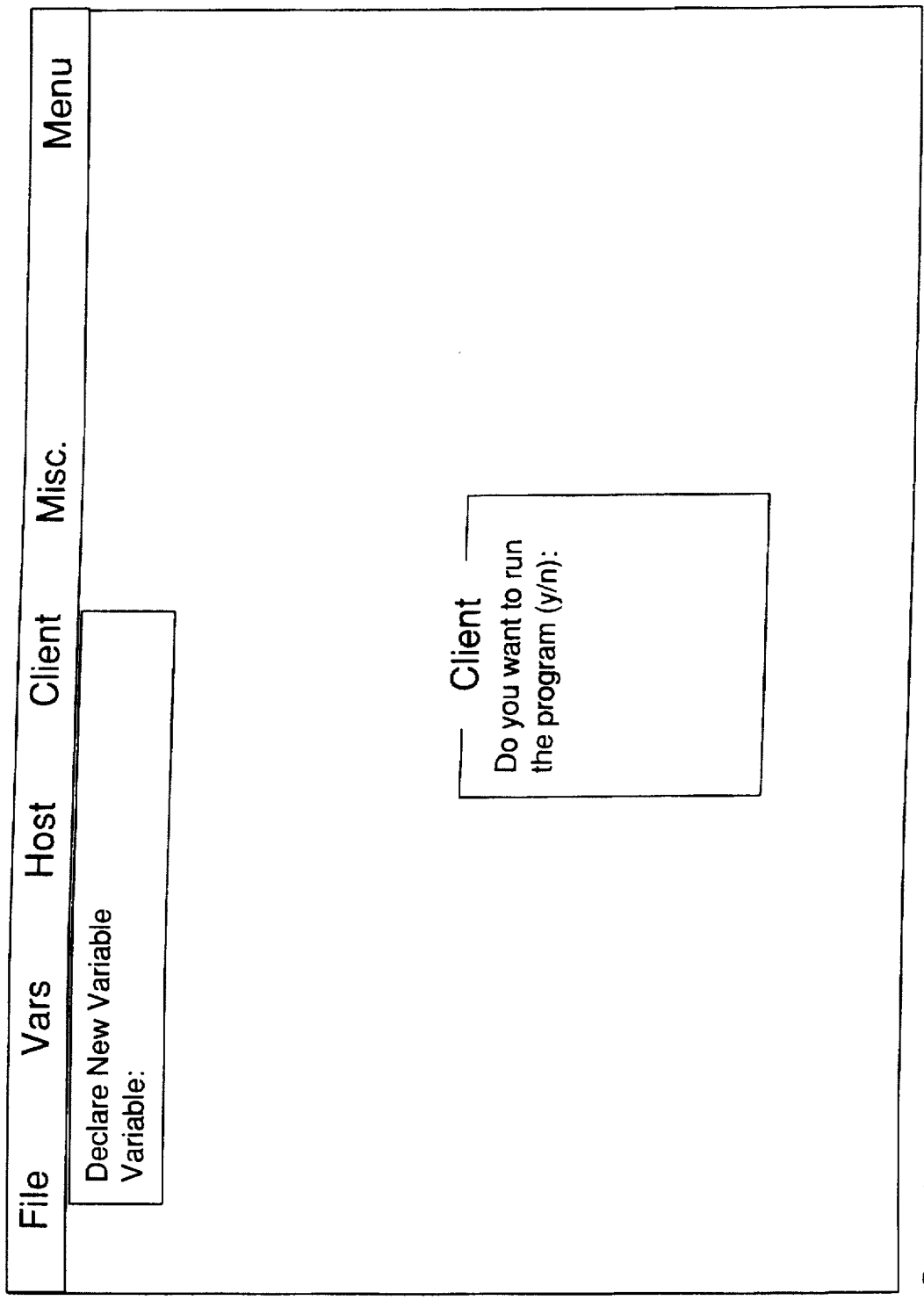
Figure 23:
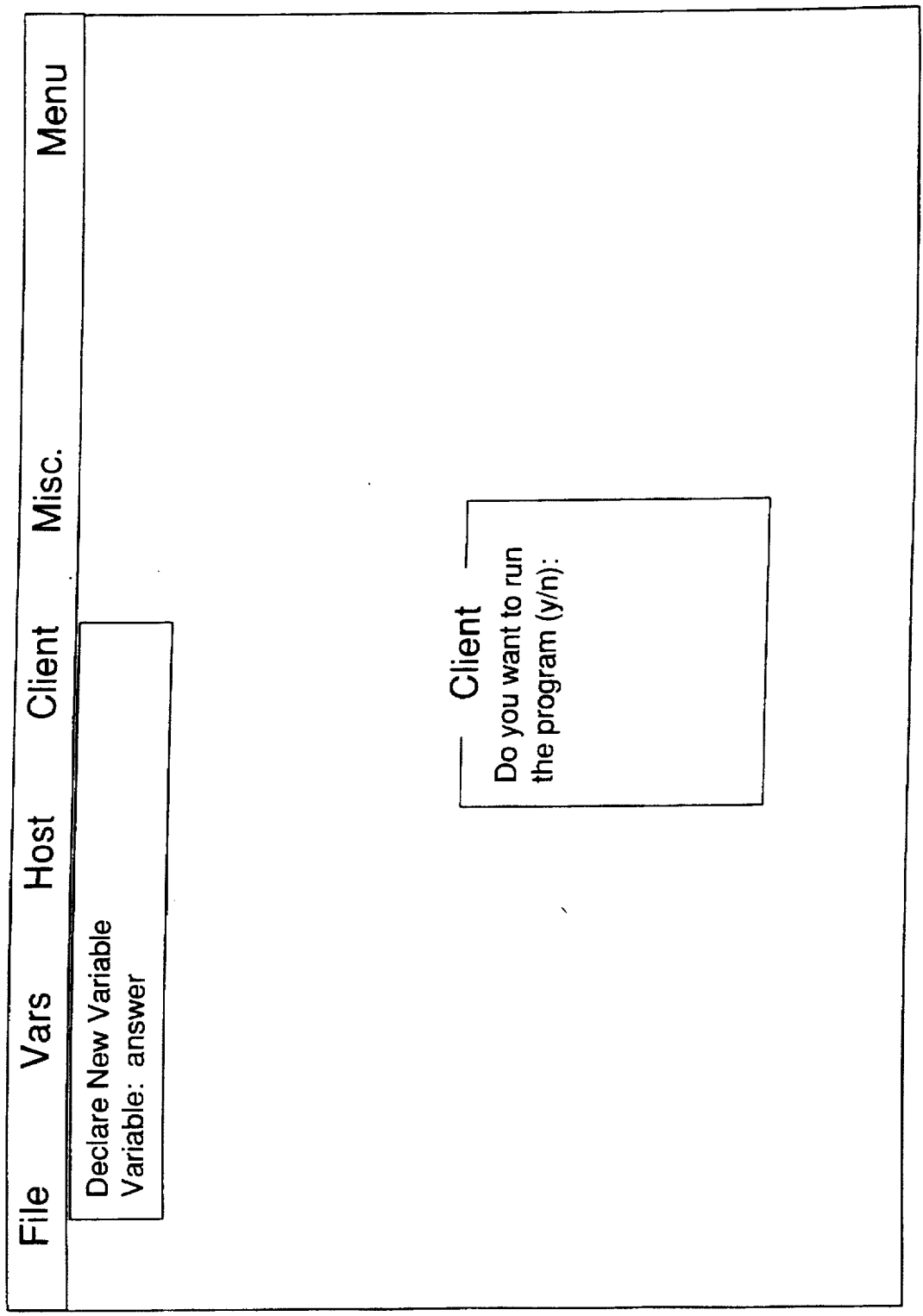

Step 4: (FIGS. 21 through 23)

Access the Vats menu and select [Declare Variable]. A variable may be declared to store the response from the client to the question in Step 3. The variable name [answer] is entered.

Figure 24:
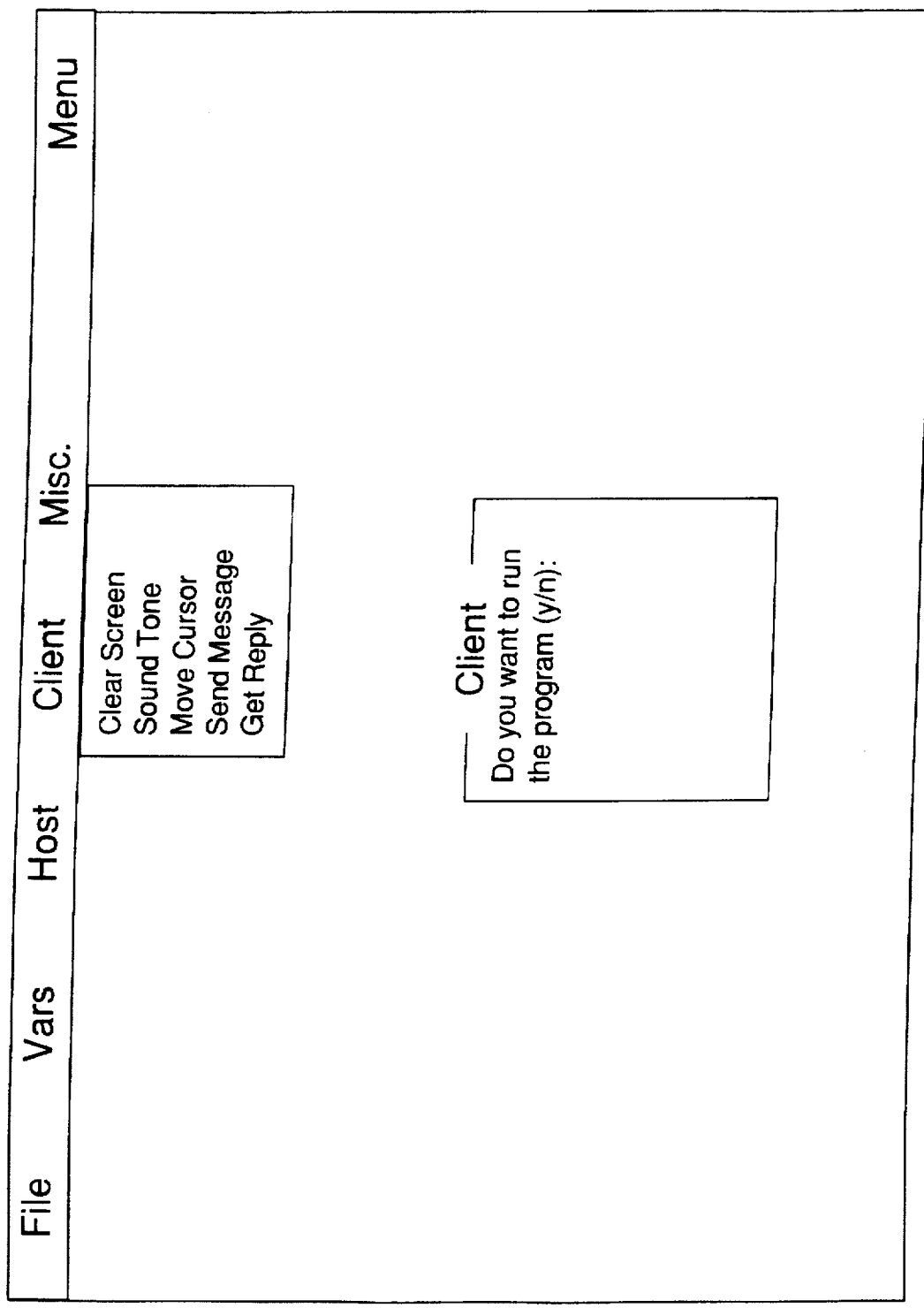
Figure 25:
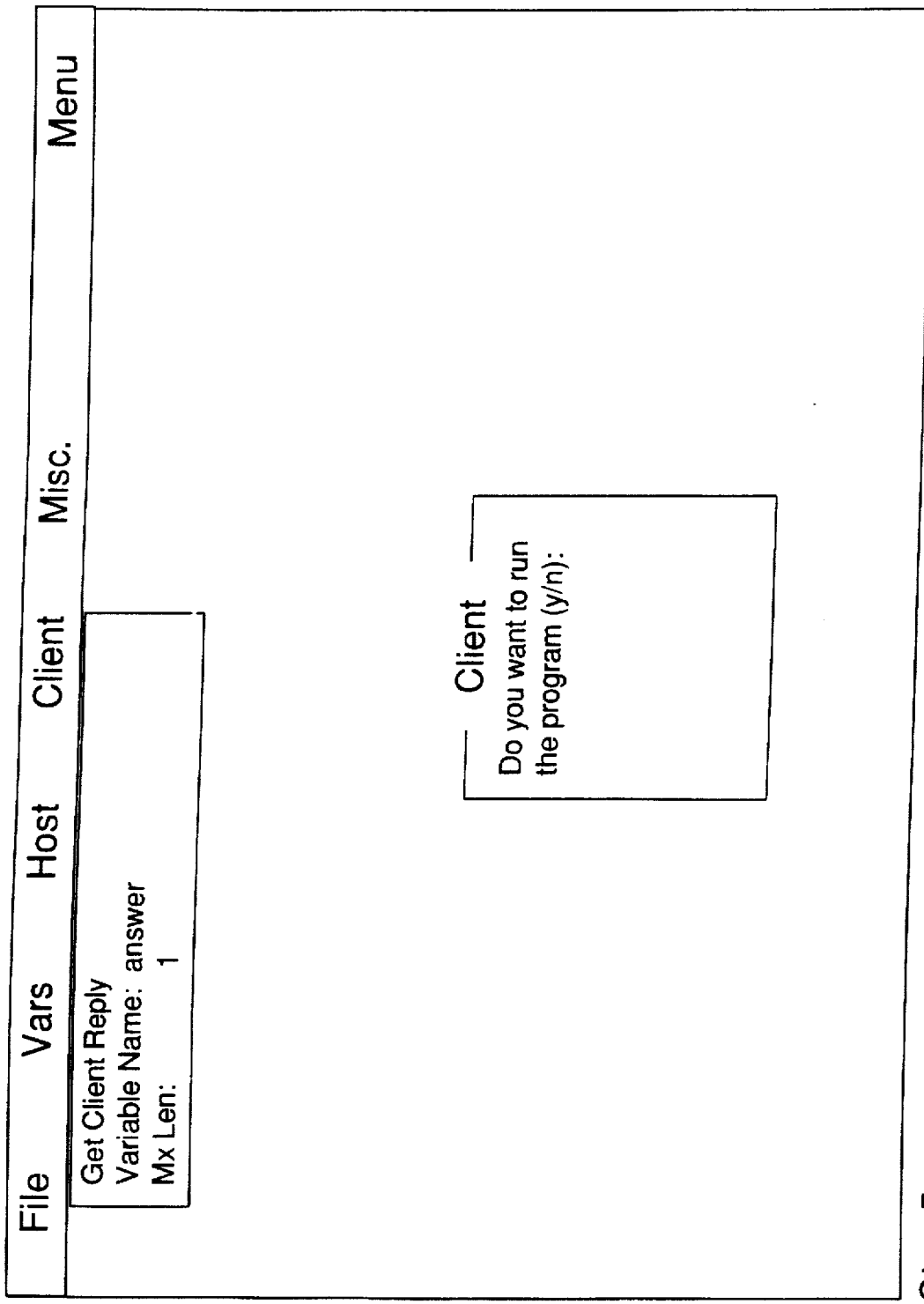

Step 5: (FIGS. 24 through 25)

Access the Client menu and select [Get Reply]. Type [answer] [tab] [1] to enter "answer" as the variable the response from client will be stored into and sets the maximum length equal to one character. Note that the [backspace] now works as would normally be expected for editing mistakes.

Figure 26:
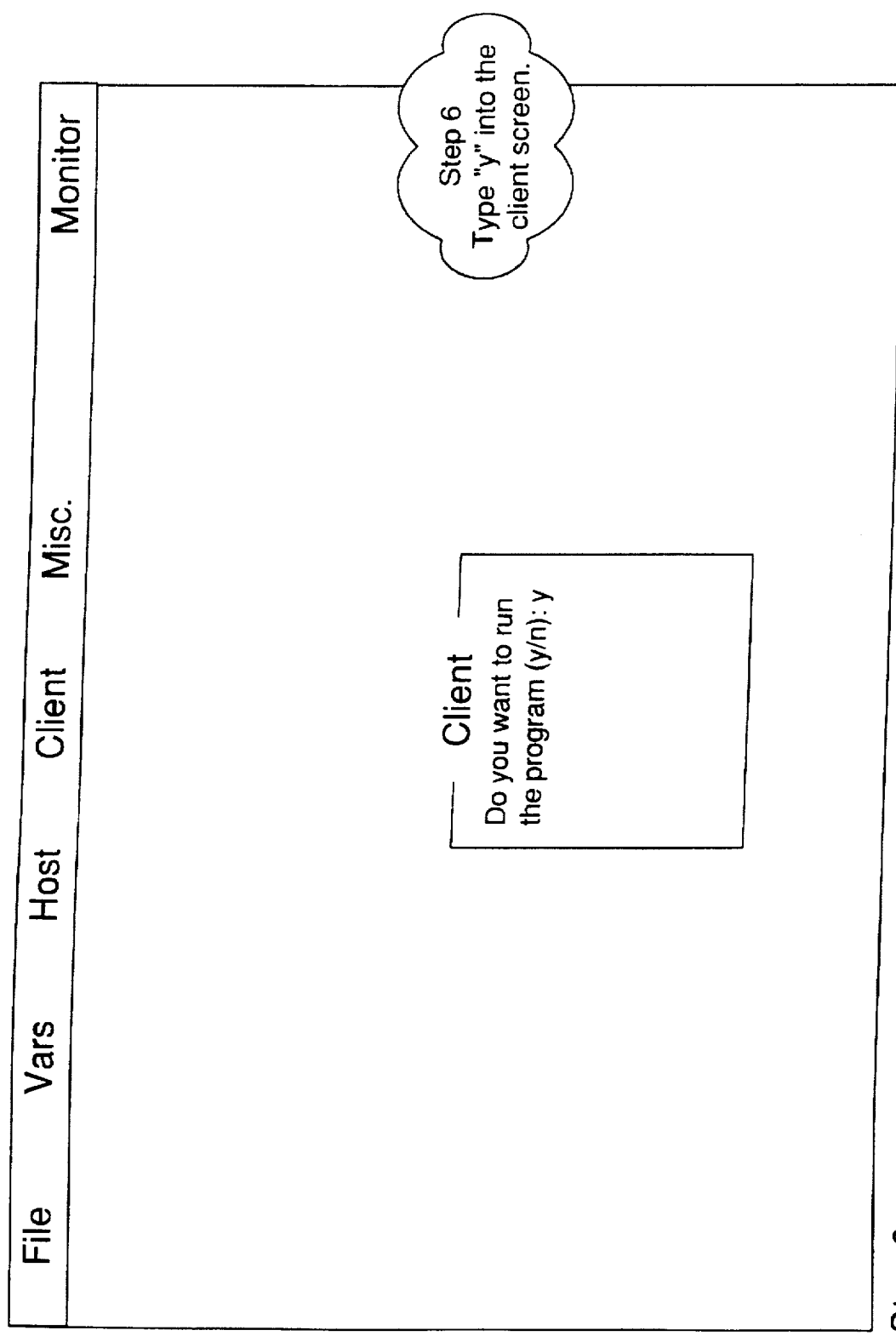

Step 6: (FIG. 26)

There are two options that need to be defined. The first is for a "y" or yes response, in general a typical training procedure would be to go through the "normal" path required to operate the application. In this case normal means "y", so we will respond with a "y", later in the example the training for the "n" can be entered.

Figure 27:
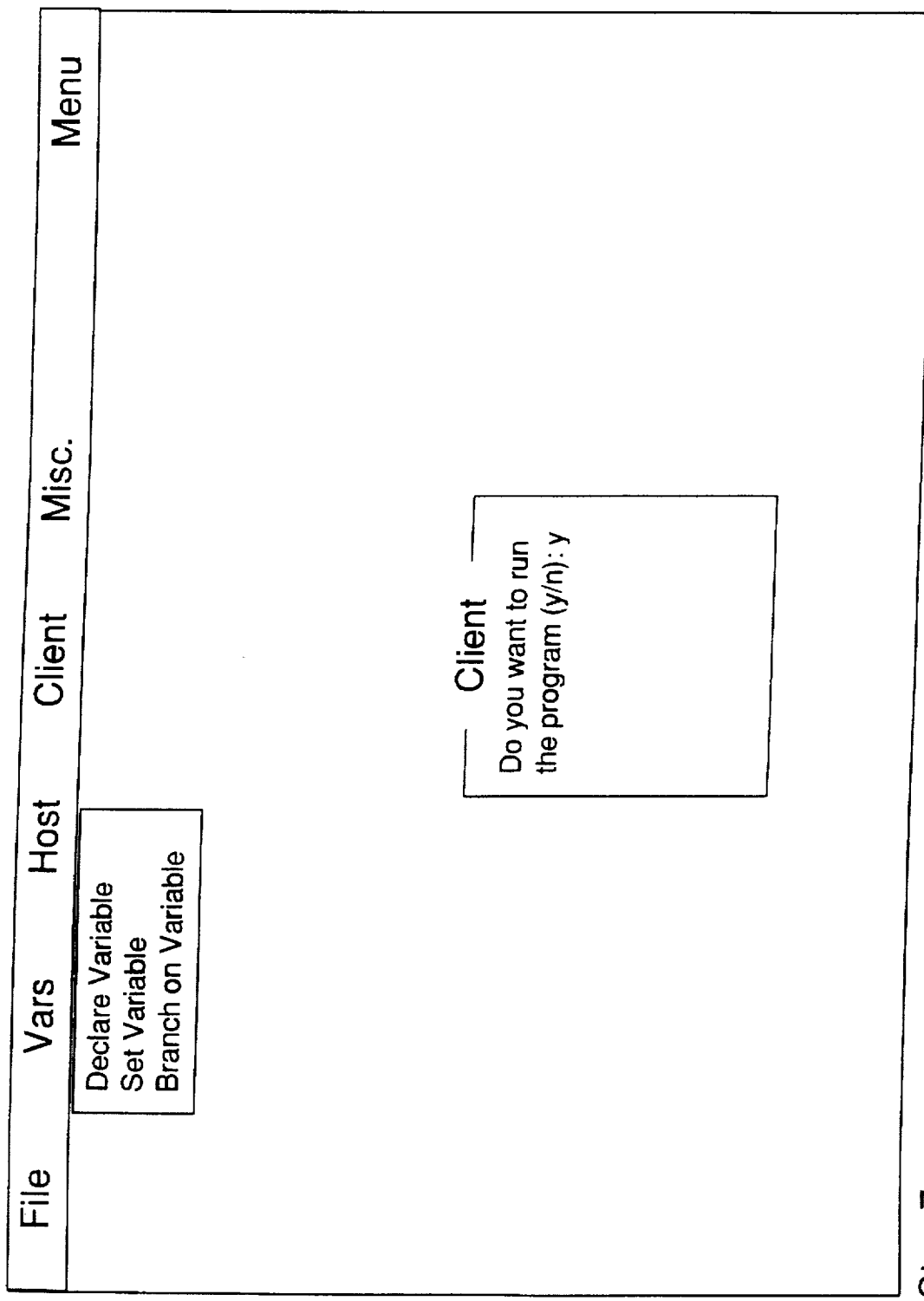
Figure 28:
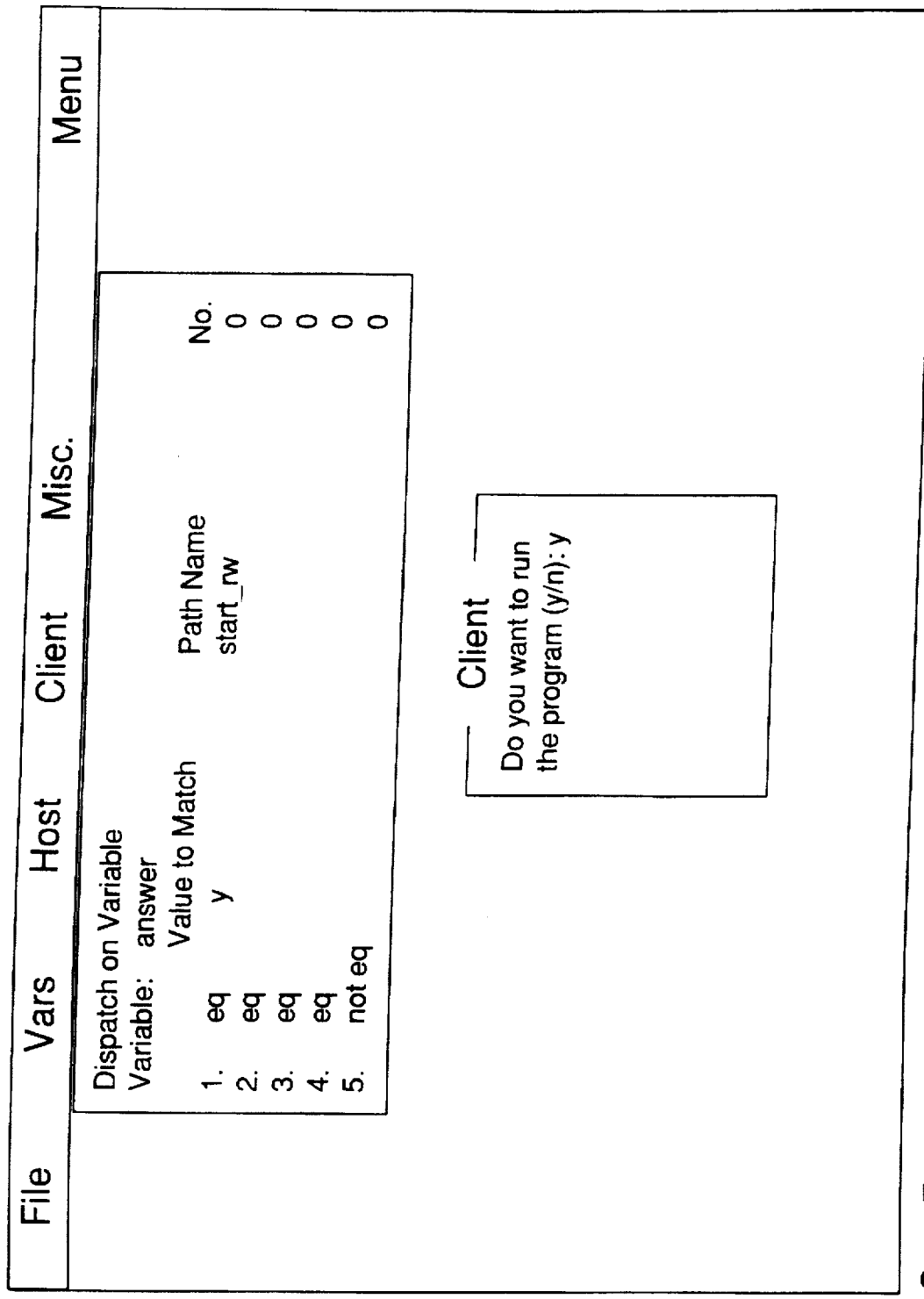
Figure 29:
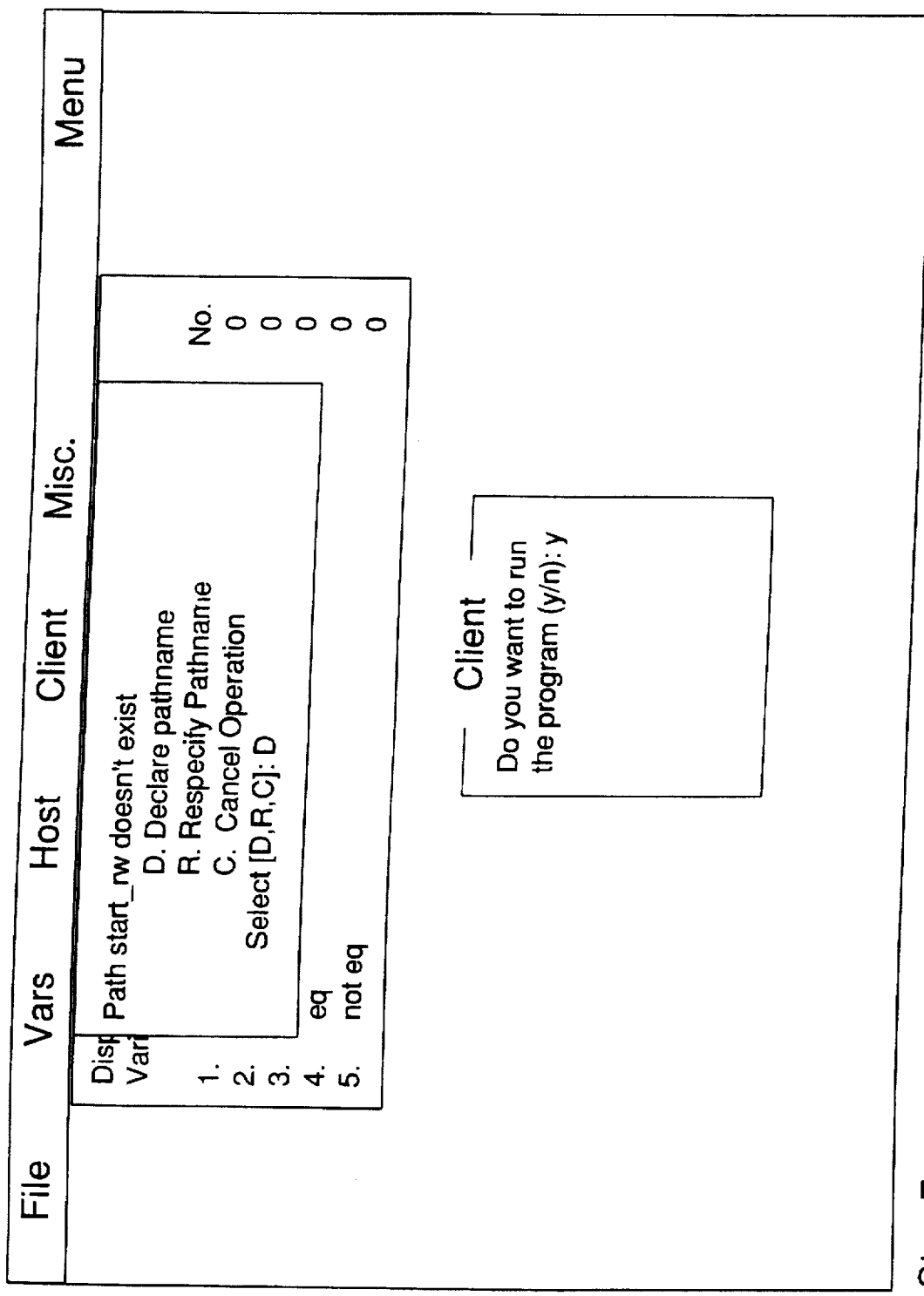

Step 7: (FIGS. 27 through 29)

Access the Vats and select [Branch on Variable]. Type [answer] [tab] [y] [tab] [start_rw] [tab]. This defines the action: if the variable "answer" equals the value "y" then proceed with the path named "start_rw". In the next menu select [d] to declare a pathname. At this time the "n" action may also be defined. Type [n] [tab] [exit] [tab] [d] which causes the path "exit" to be run when "answer" is equal "n".

Now the path named "start_rw" is created.

Host Connection/logon/application access: for our training example we will be running both the application and the present invention on the same host. The application is therefore referred to as running on a local host as opposed to running on a different or remote host. The following instructions apply to accessing an application via a pseudo terminal (PTY) on a local host only. You have to be logged onto the local host in order to run the present invention, therefore, with this method of connection you are not required to logon to the host prior to accessing the application. Refer to the applicable section for other connection methods.

PATH NAME: start_rw

Figure 30:
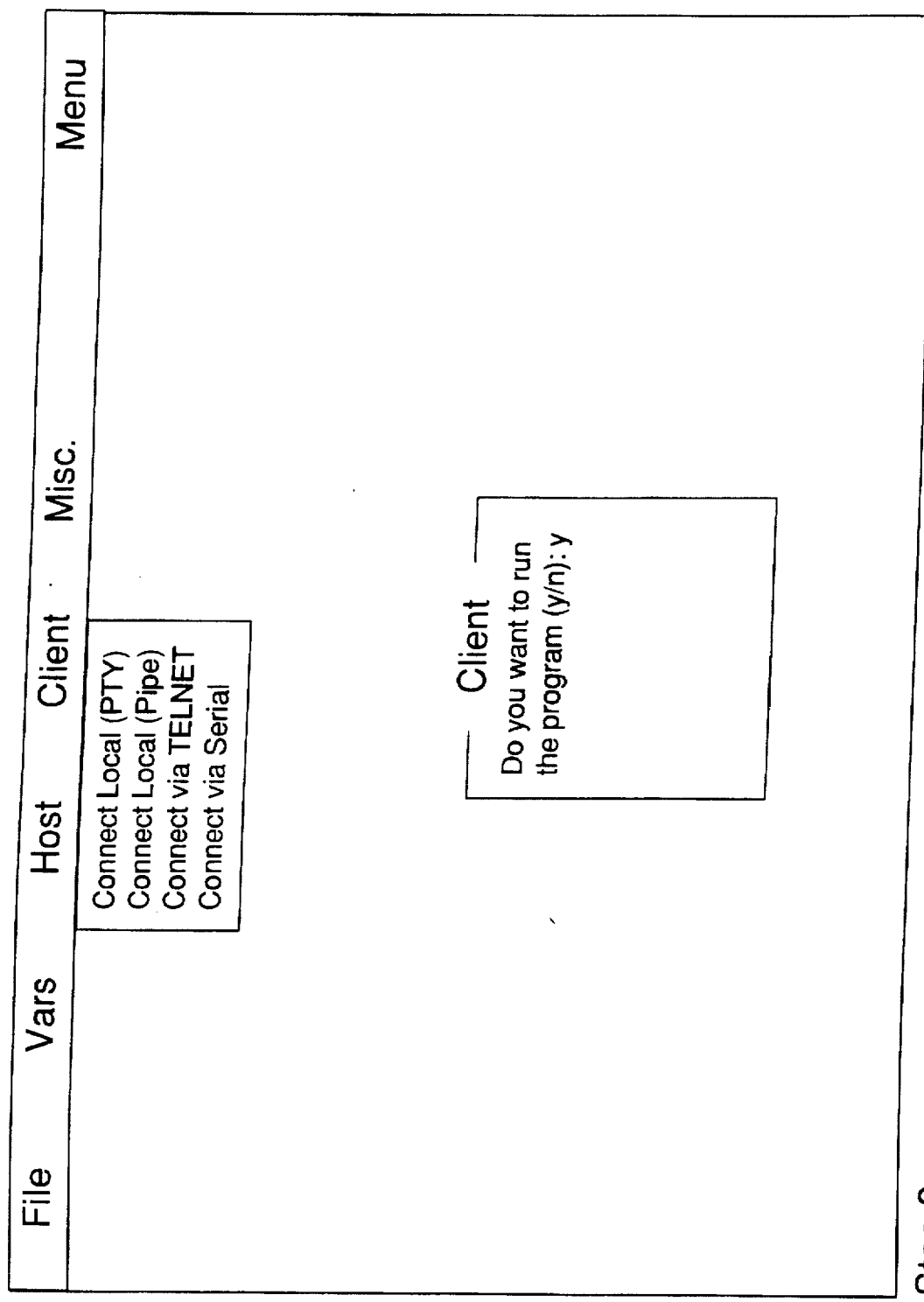
Figure 31:
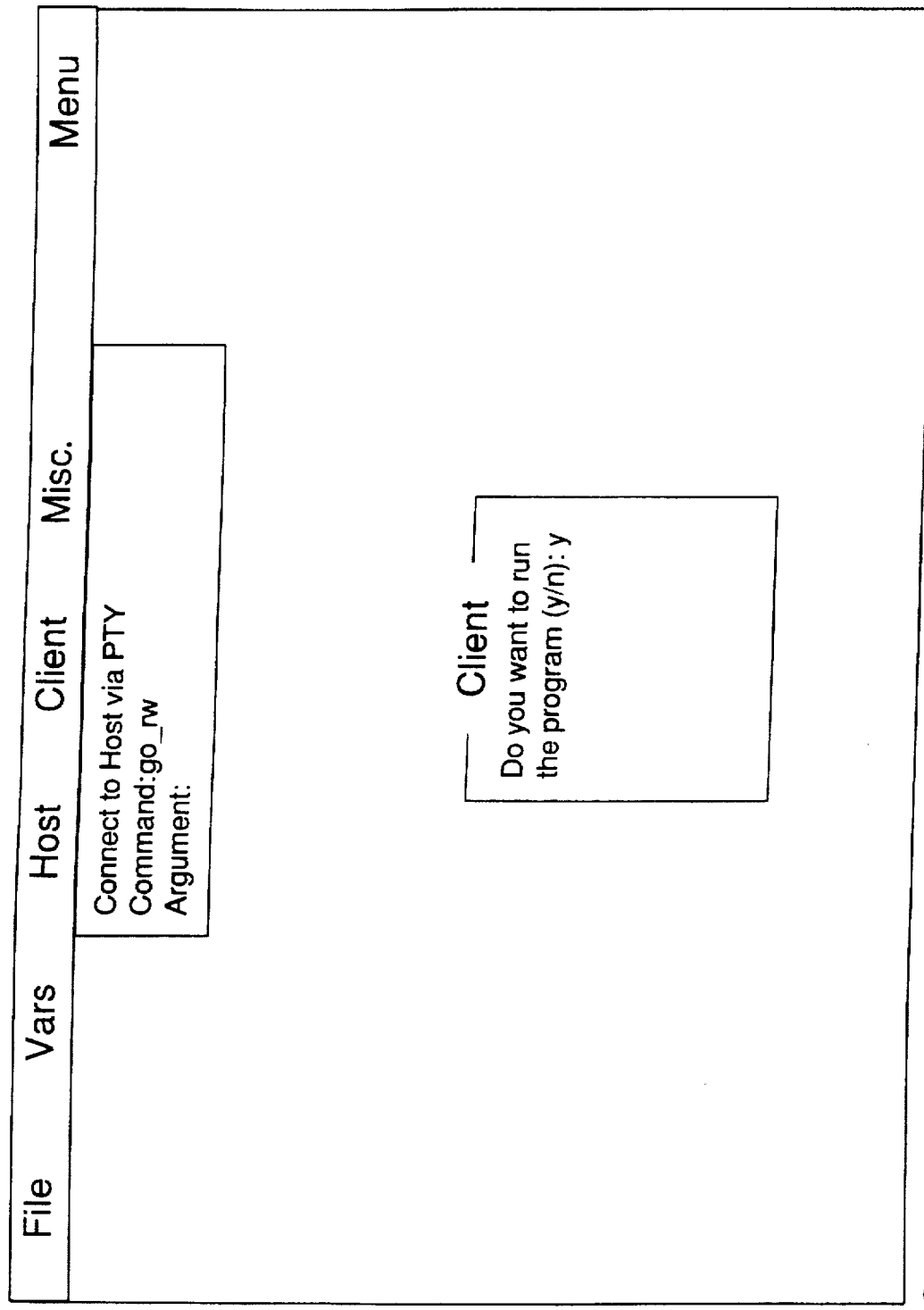

Step 0: (FIGS. 30 through 32)

Access the Host menu option. Once you are "in" the menu bar you may use the arrow keys to navigate. Use the down arrow to "pull down" the HOST window shade. Select [Connect Local (PTY)] by highlighting this option and pressing [enter]. You will now be prompted for Command: enter the keys you would normally use to access your application, for real world type [go_rw], you can leave the Argument: line empty, press [end] to compete this step. You will notice that when you press [end] the Virtual User sends your keystrokes as a command line entry to the host. You should now see the first screen of the Real World application in the terminal (middle) window.

Alternate using [Exec Procedure]

Step 0:

Access the Misc menu and select [Exec Procedure]. Type [go_rw] [end].

Automated Navigation through access menus: you are now ready to train the Virtual User how to navigate through your application. As you will see, the first step to perform at cursor stops is a "Wait for Host" step. This operation makes sure that the Virtual User and host application are synchronized with each other. If you try to send information to the host it will ask you to perform a "Wait for Host" first. The order that you prompt for Client input is entirely up to you, this tutorial follows some basic guidelines.

PATH NAME: nav_menus

Figure 34:
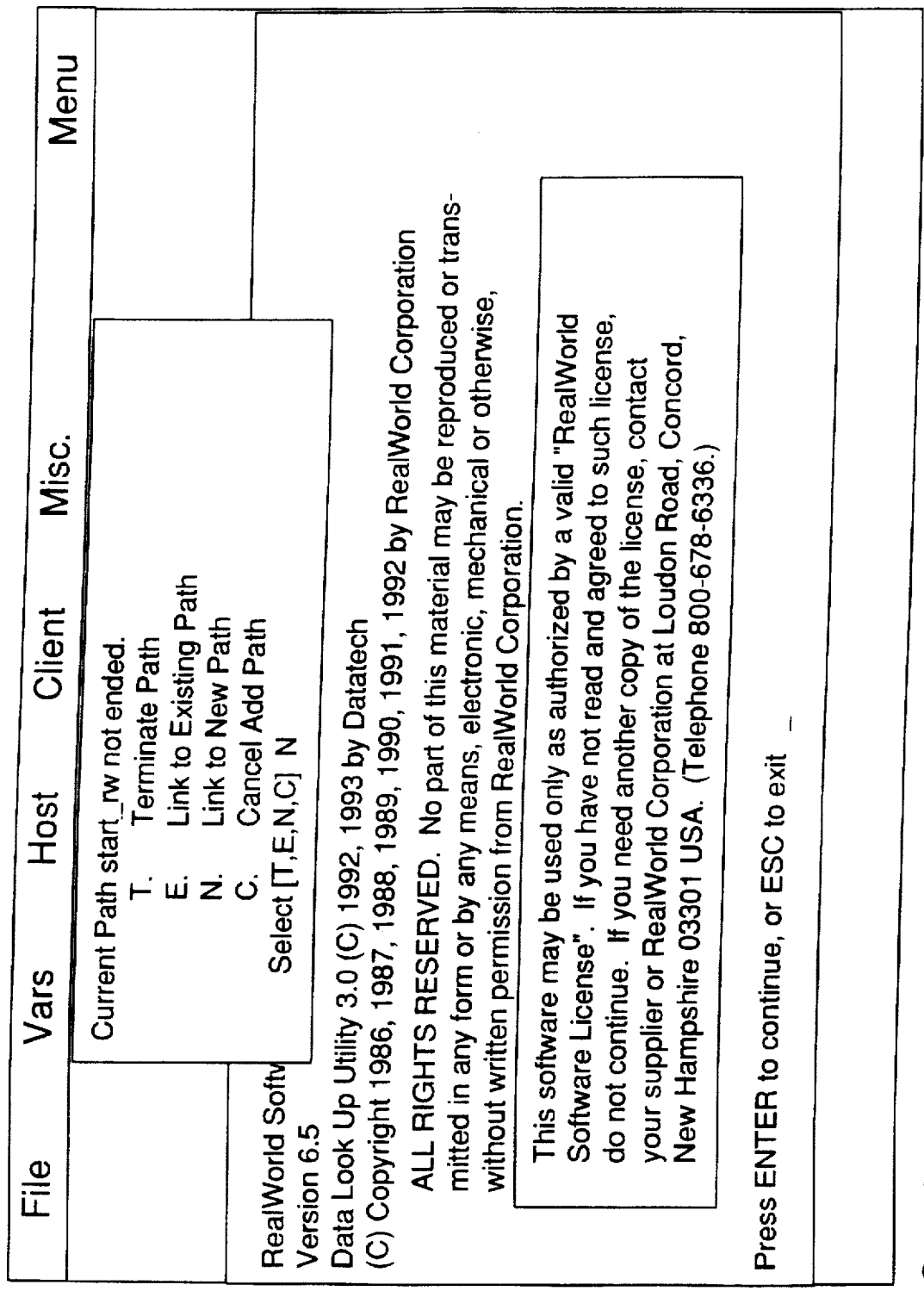

Step 0: (FIGS. 33 through 35)

Access the Misc menu and select [Start New Path] [enter]. Type [nav_menus] [end]. NOTE: "nav_menus" was chosen as a name because this path will navigate through the menus required to access our desired transaction. The underscore is required in the name, no spaces are allowed.

Figure 36:
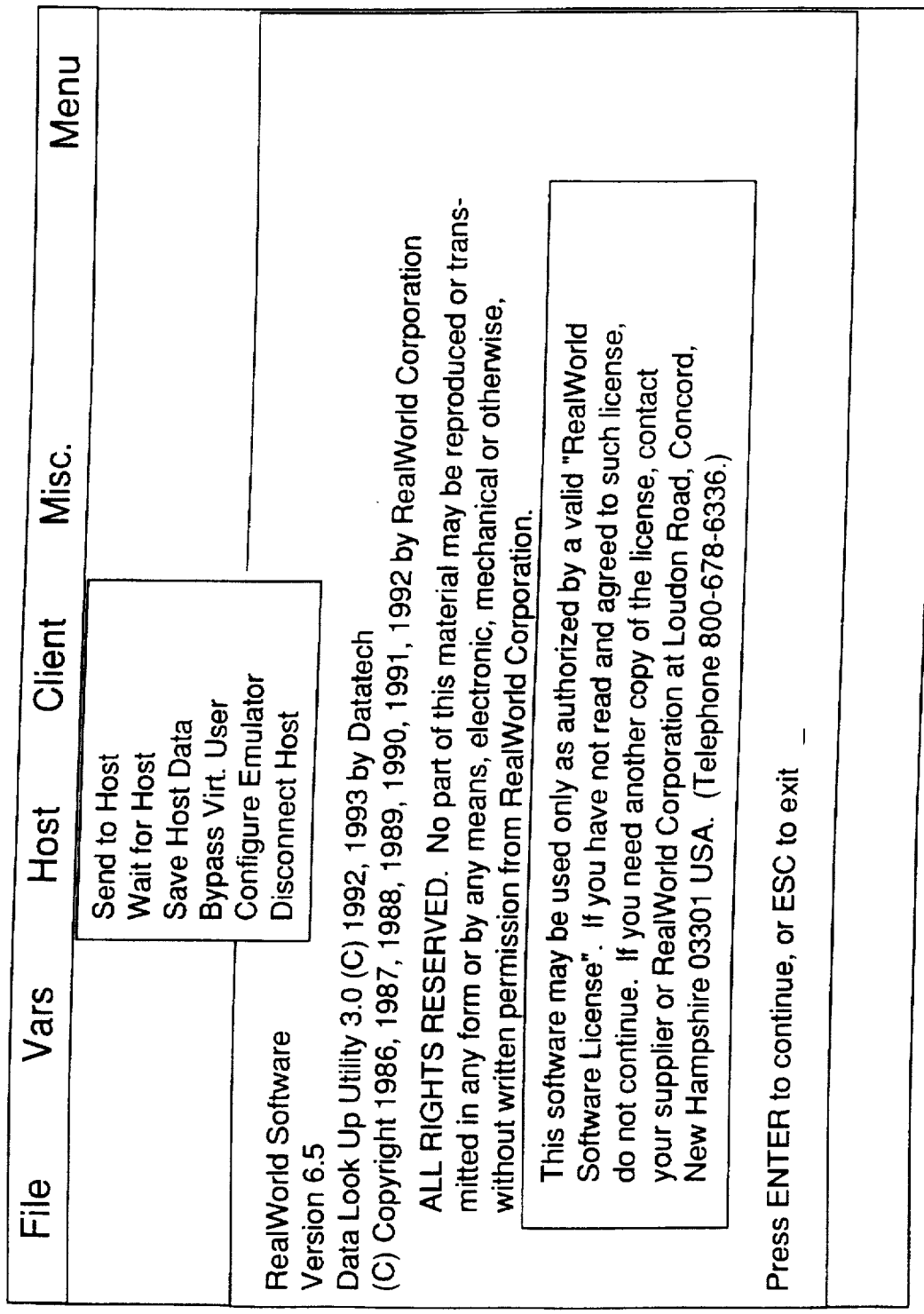
Figure 37:
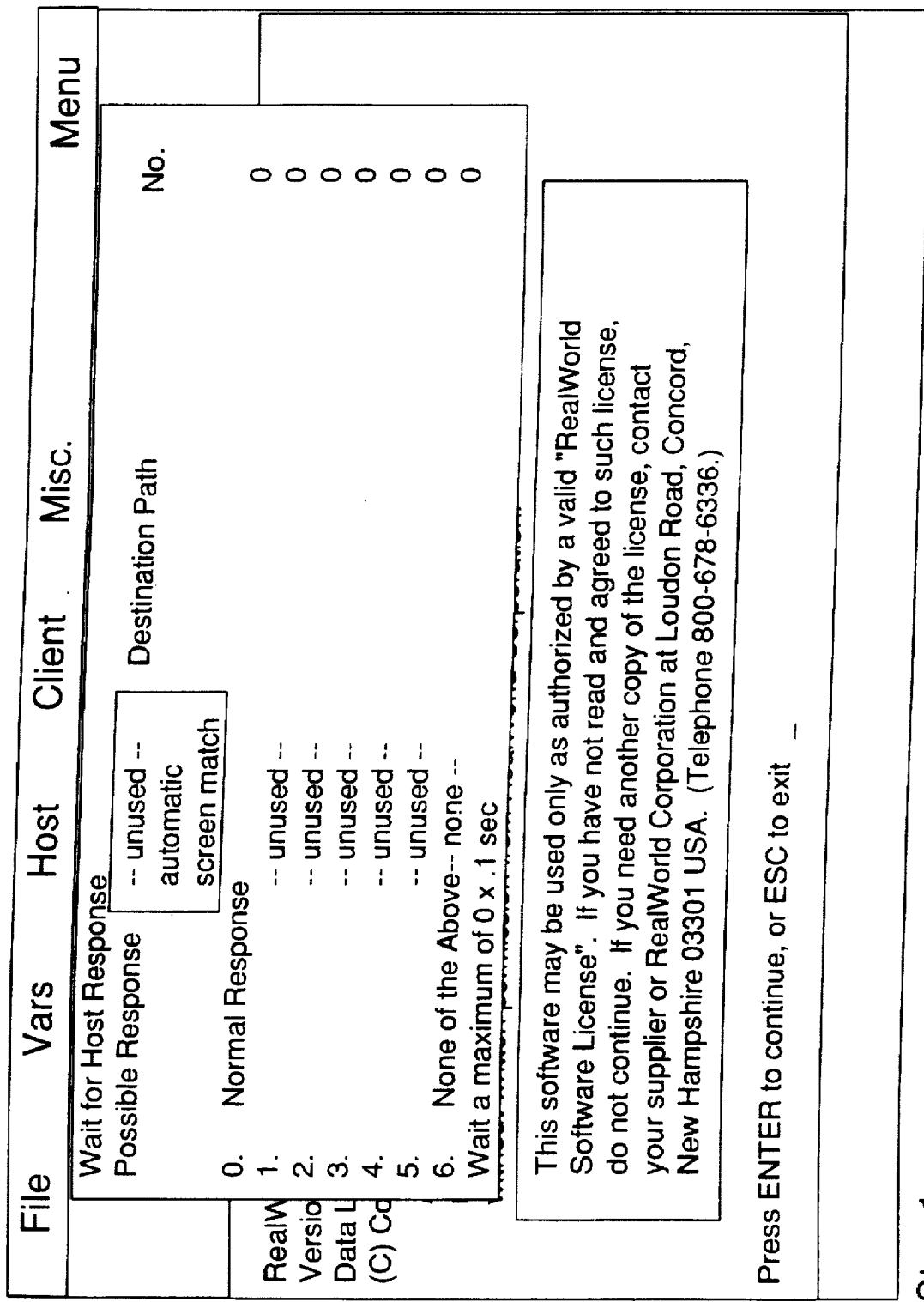

Step 1: (FIGS. 36 through 38)

Access the Host menu and select [Wait for Host]. Press [enter] and use the down arrow to select [automatic], press [enter] [enter]. You have now confirmed an automatic host synchronization for the string "o continue, or ESC to exi" to appear at the bottom of the Host screen.

Figure 39:
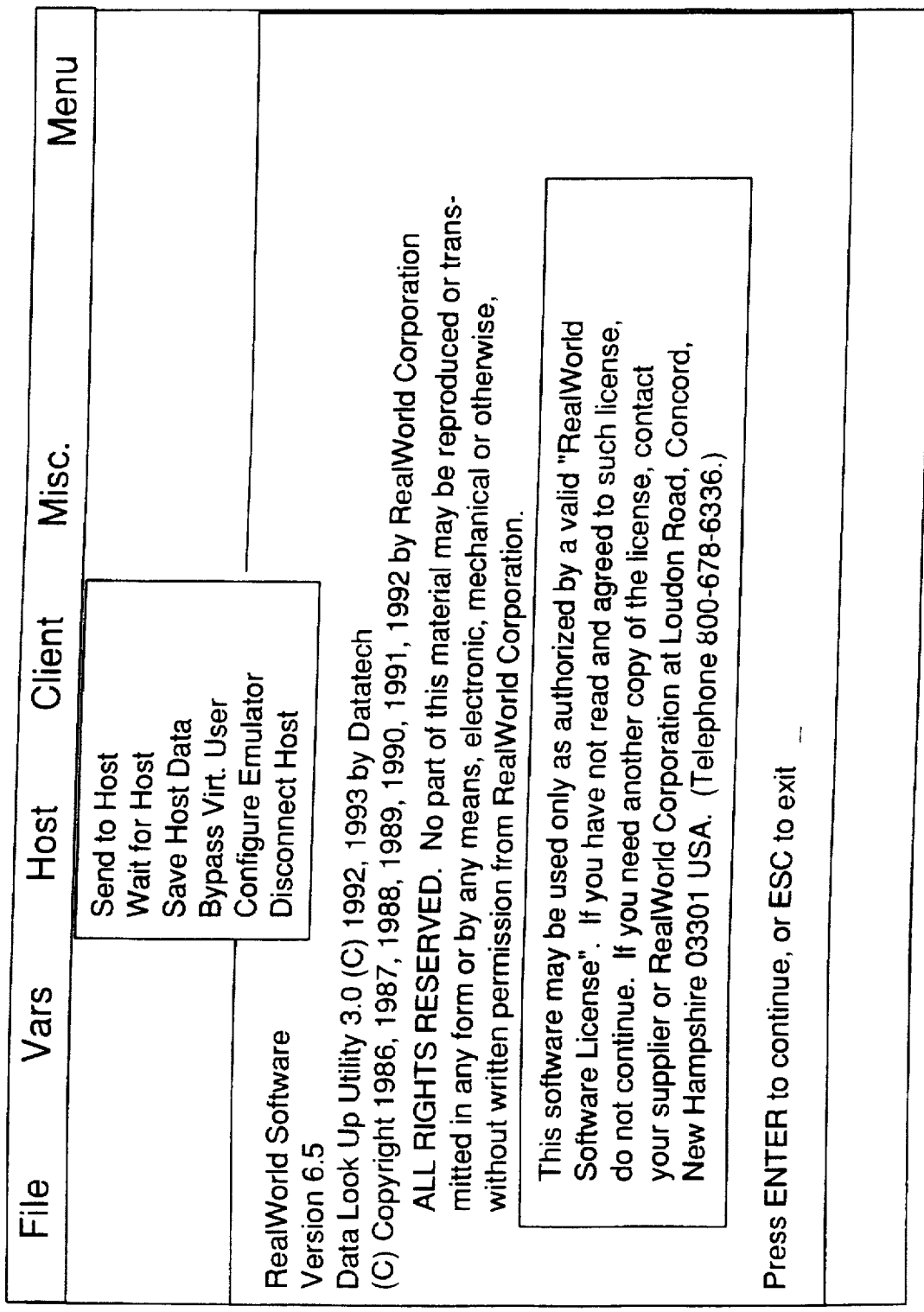
Figure 40:
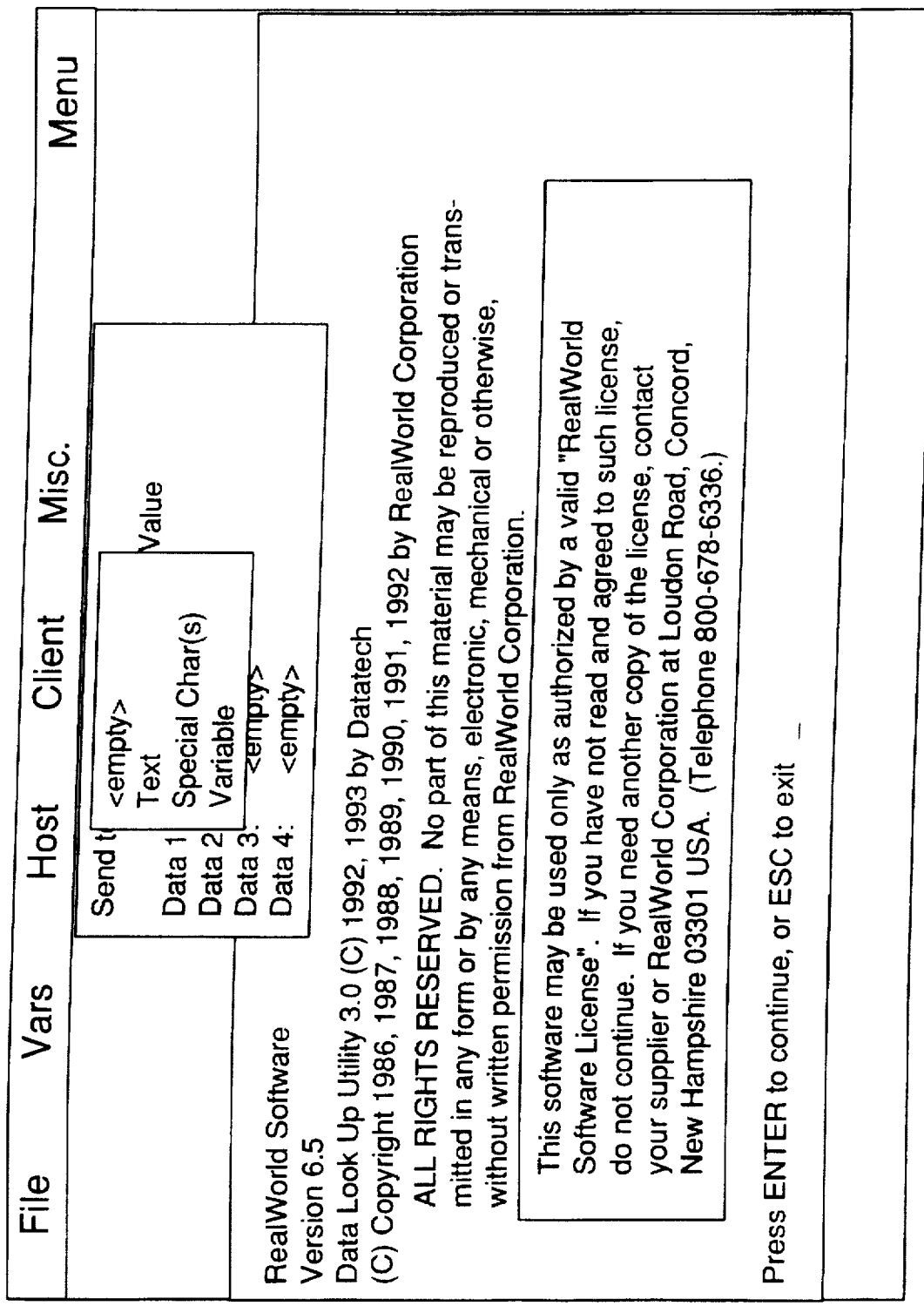
Figure 41:
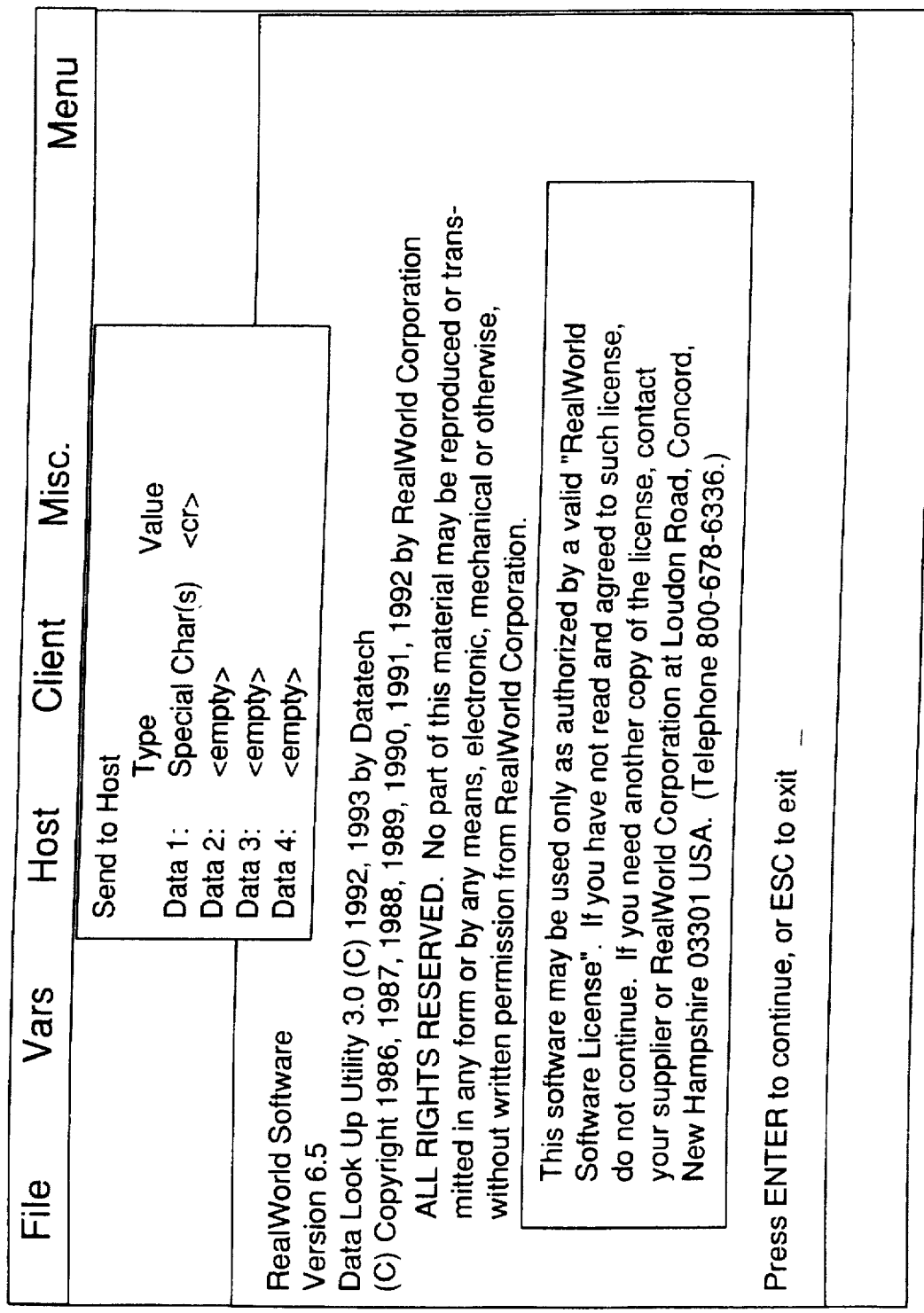

Step 2: (FIGS. 39 through 41)

Access the Host menu and select [Send to Host]. In the submenu select [Special Char(s)]. Press [enter], you should see <cr> in the window, press [,] [enter], edit using the [tab] key where necessary, press [end] to activate this step. You should see the application respond to the VU's carriage return with the next screen, now you need to enter your initials.

Step 3: (FIG. 42)

We could easily "hardcode" a set of initials by using the sequence in step #2 or we could prompt the Client for "User Initials". To prompt the Client for user initials, proceed as follows. Access the Client menu, use the down arrow to select [Clear Screen]. The Client screen should now be blank, you might not see any change because the old prompt "Real World (y/n)?" is hidden behind the terminal window.

PATH NAME: item_transfer

Step 0: (FIGS. 43 through 45)

Access the Misc menu and select [Start New Path]. Type [item_transfer] as the name of the path. This path will prompt the Client with information to complete an item transfer transaction. The program will give you the option to link the last path "access" to the new path "item_transfer". Press [h] to select "link to New Path".

Step 1: (FIG. 46)

As in prior steps, we will clear the screen. Access the Client menu and select [Clear Screen]. The Client screen should now be blank.

Step 2: (FIG. 47)

As above, access the Client menu and select [Move Cursor]. Select row 1 and column 1. The cursor should now blink at the x,y position of 1,1 on the Client screen.

Step 3: (FIGS. 48 through 49)

Access the Client menu and select [Send Message]. Select [Text] in the submenu. The message to be displayed on the Client screen is now entered. Enter [item:]. The prompt "item:" now appears on the Client screen.

Step 4: (FIG. 50)

As before, access the Vats menu and select [Declare Variable]. The variable for storing the Client response to the item prompt is now declared. The name [item] is entered as the name of the variable.

Figure 51:
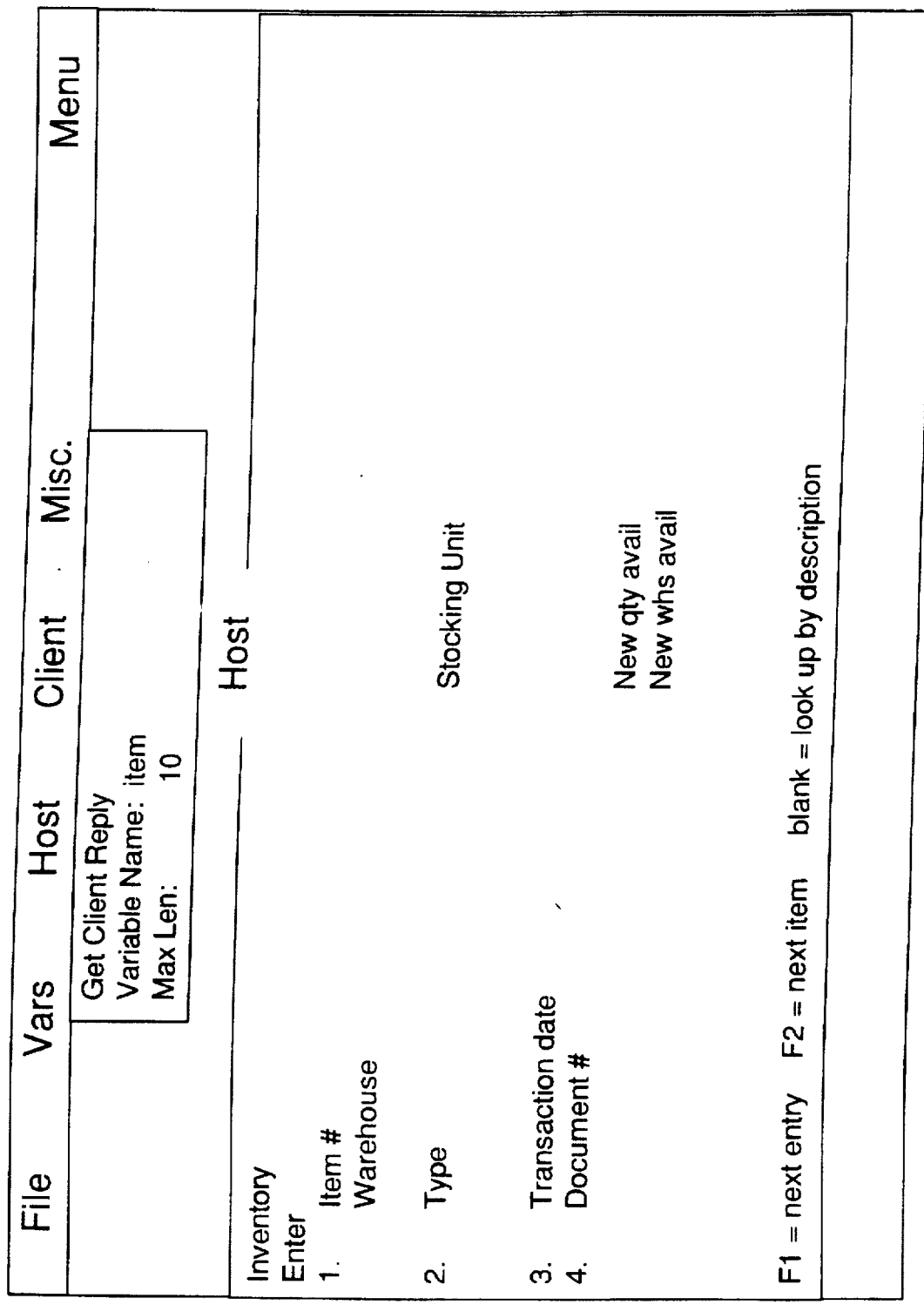
Figure 52:
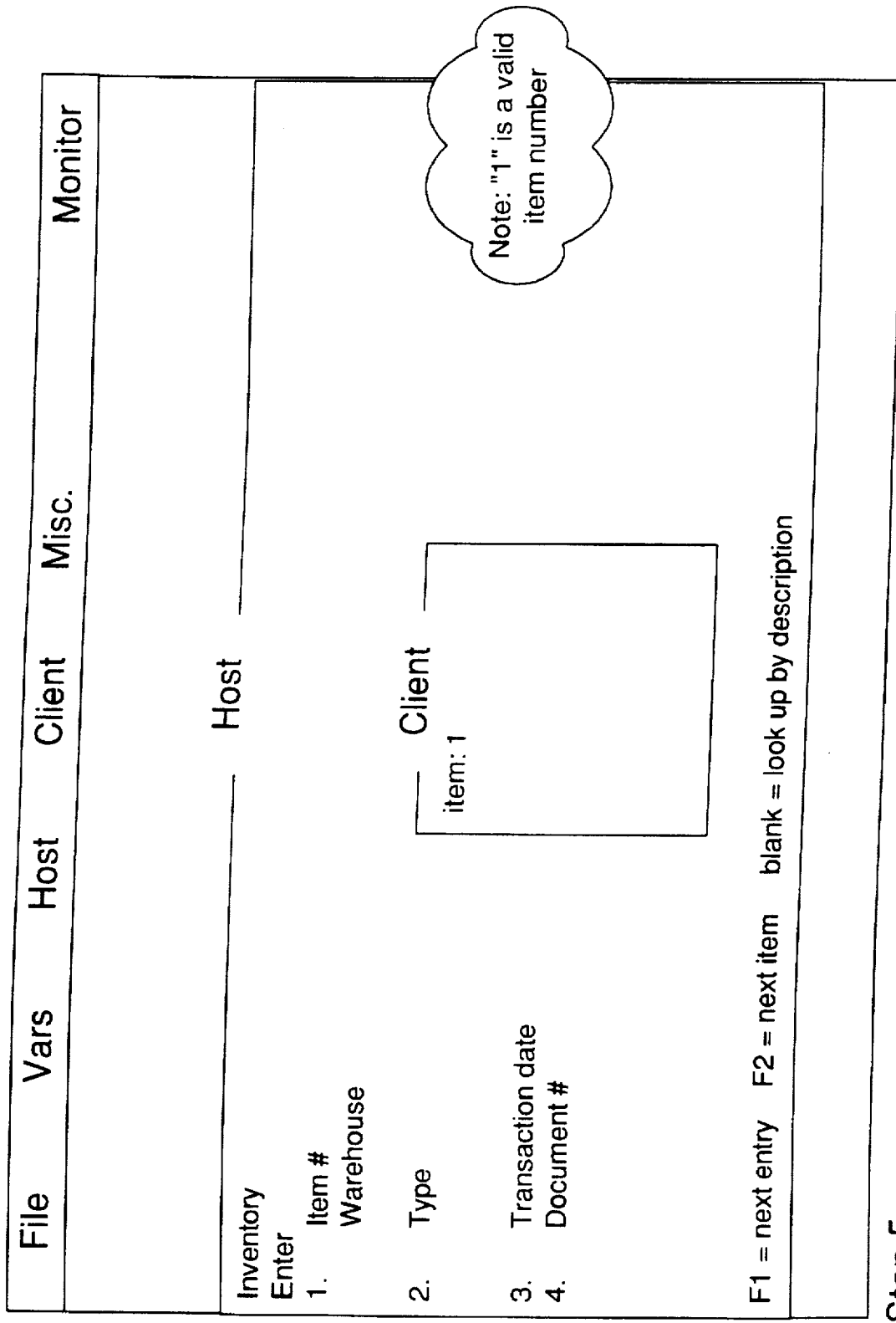

Step 5: (FIGS. 51 through 52)

Access the Client menu and select [Get Reply]. The replay from the Client will now be entered and stored into the variable "item". Type [item] [tab] [10] to enter "item" as the variable for the Client's response and a maximum length of ten characters will be allowed. The menu bar will be replaced with Waiting for Client Input at Client or here. A valid item number may now be entered.

PATH NAME: update_host.

Step 0: (FIG. 53)

Access the Misc menu and select [Start New Path]. Type [update_host] as the new path name for this sequence of steps. This path will update the host with the response received under "item_transfer" path

9

Step 1: (FIG. 54)

As before, access the Client menu and select [Clear Screen] to clear the screen at this time.

Step 2: (FIG. 55)

As before, access the Client menu and select [Move Cursor]. Select row 1 and column 1 as the new location. The cursor in the Client window should now be positioned at the x,y location of 1,1.

Step 3: (FIG. 56)

As before, access the Client menu and select [Send Message]. In the submenu select [Text]. Now the message to be displayed on the Client screen is entered. Enter [Processing Data]. The prompt "Processing Data" is now displayed on the Client screen.

Step 4: (FIGS. 57 through 58)

Access the Host menu and select [Wait for Host]. Select [automatic]. This will now automatically synchronize the Host and Client. Note that error handling will be provided in the "None of the above" path of "item_error" and that the time out is set for 100×0.1 sec=10 seconds. Therefore, on an error condition, if 10 seconds elapses without a response, then item_error will be executed.

Step 5: (FIGS. 59 through 60)

Access the Host menu and select [Send to Host]. The variable "item" will now be sent to the host. Select [Variable] from the submenu and type [item] as the variable to send to the host. Select [Special Char(s)] from the submenu and enter a [cr]. This will pass a carriage return to the Host.

PATH NAME: item error

Figure 61:
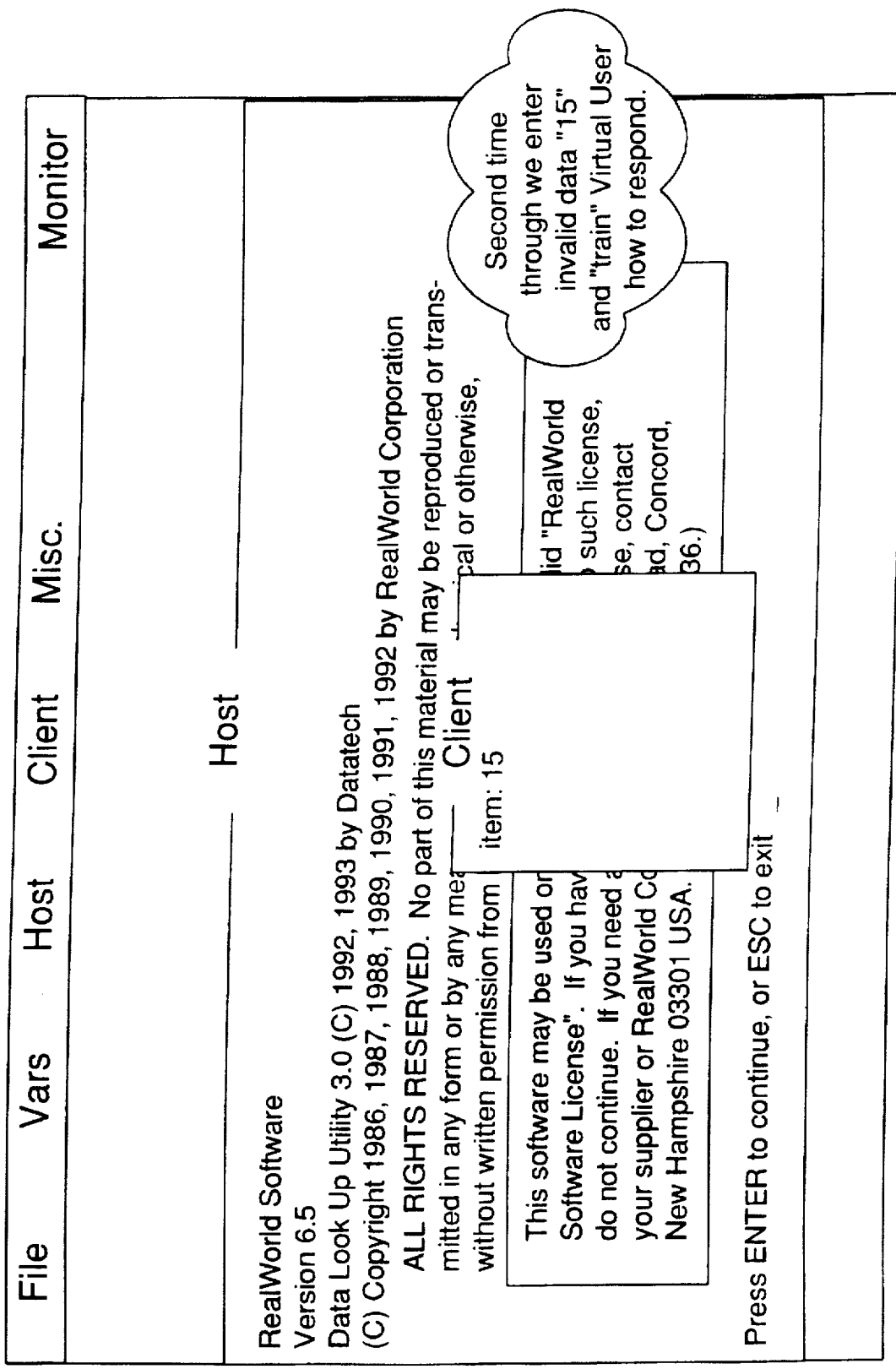

Step 0: (FIGS. 61 through 62)

Because data was entered that caused the application to go into its error handling routine, the cursor is no longer at its normal "next entry" position beside the second prompt "warehouse". Instead it is sitting at the bottom right hand corner of the screen with a message "Press ENTER or F8". Note that the error message "Item not on file" is displayed at the left hand corner of the screen. Step 4 of "update_host" had an error handling routine named "item_error" defined as the path to use if "none of the above" condition is true. Therefore, control has been passed to "item_error" to handle the error condition. Access Host and select [Wait for Host]. You have now confirmed an automatic host synchronization.

Step 1: (FIG. 63)

As before, access the Vats menu and select [Declare Variable]. This variable will store the host data that is currently in the "error window" on the host screen. Type [item_error] to declare the variable "item_error" which will be used in the next step.

Figure 64:
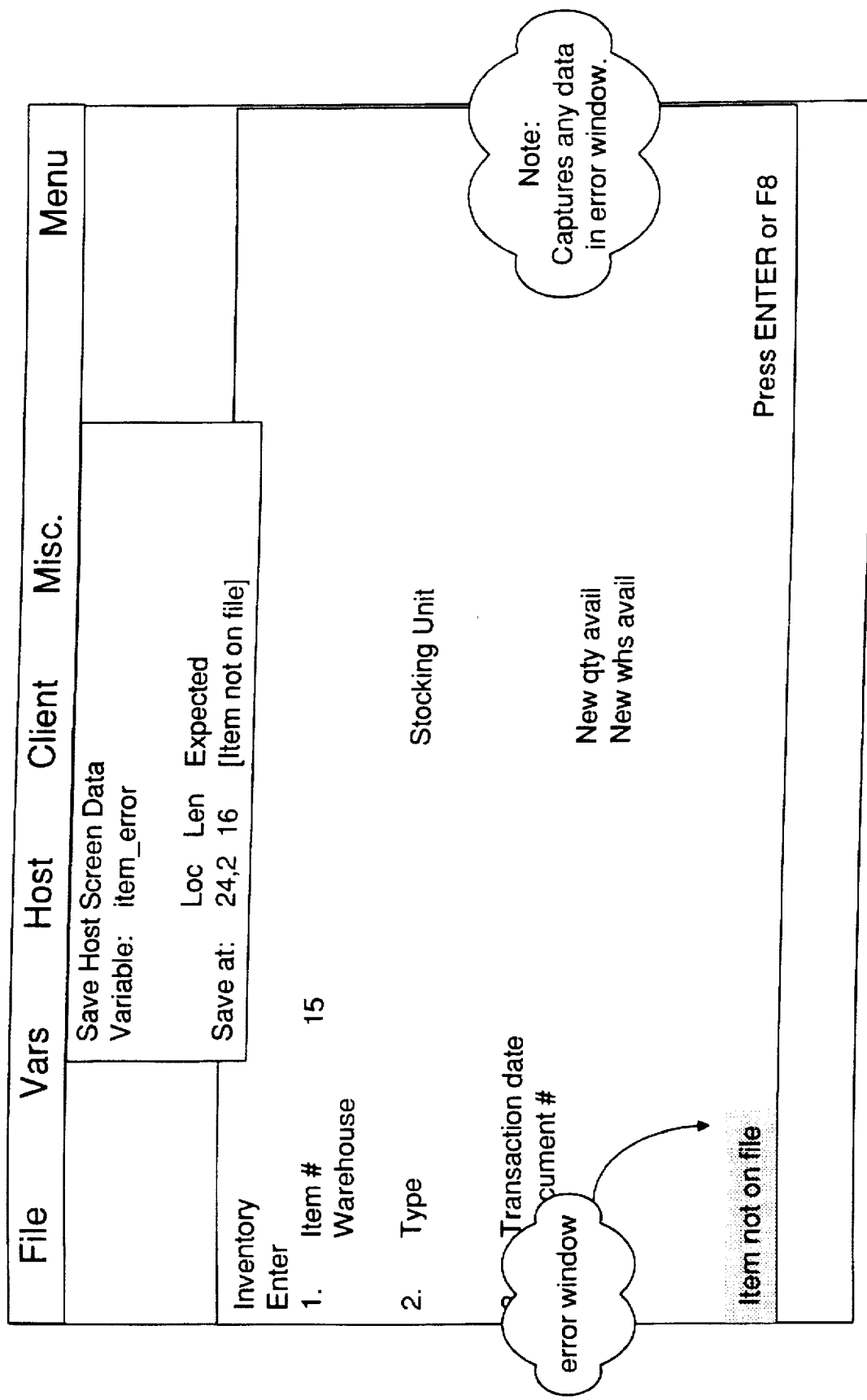

Step 2: (FIG. 64)

Select the Host window shade and select "save host data". Enter the variable declared in step 1 and use the arrow keys to move the "window" over the error message on the screen. Use the shift "+" or "−" keys to increase or decrease the size of the "window" defined by the square brackets in the "Save Host Screen Data" box.

Step 3: (FIG. 65)

As before, access the Client menu and select [Clear Screen]. The Client screen should now be cleared.

Step 4: (FIG. 66)

As before, access the Client menu and select [Move Cursor]. Set the row to 1 and the column to 1. The cursor should move to the x,y location of 1,1 in the Client screen.

Step 5: (FIG. 67)

Select [Sound Tone] from the Client menu. A tone will be issued to the Client to notify the user of an error.

10

Step 6: (FIG. 68)

As before, access the Client menu and select [Send Message]. In the submenu select [Variable]. Enter "item_error" as the variable name and select [Special Char(s)] and define a carriage return and line feed so the next line of text does not overwrite the error message. Select [Text] and enter the message you want displayed on the Client screen. Select [Special Char(s)] and enter a carriage return, line feed and the last part of the message to be displayed. In this example, the text "<cr> <lf> Press ENTER to <cr> <lf> continue:".

Step 7: (FIG. 69)

As shown in the above steps, declare a new variable "answer" to get the ENTER key from the client in order to continue.

Figure 70:
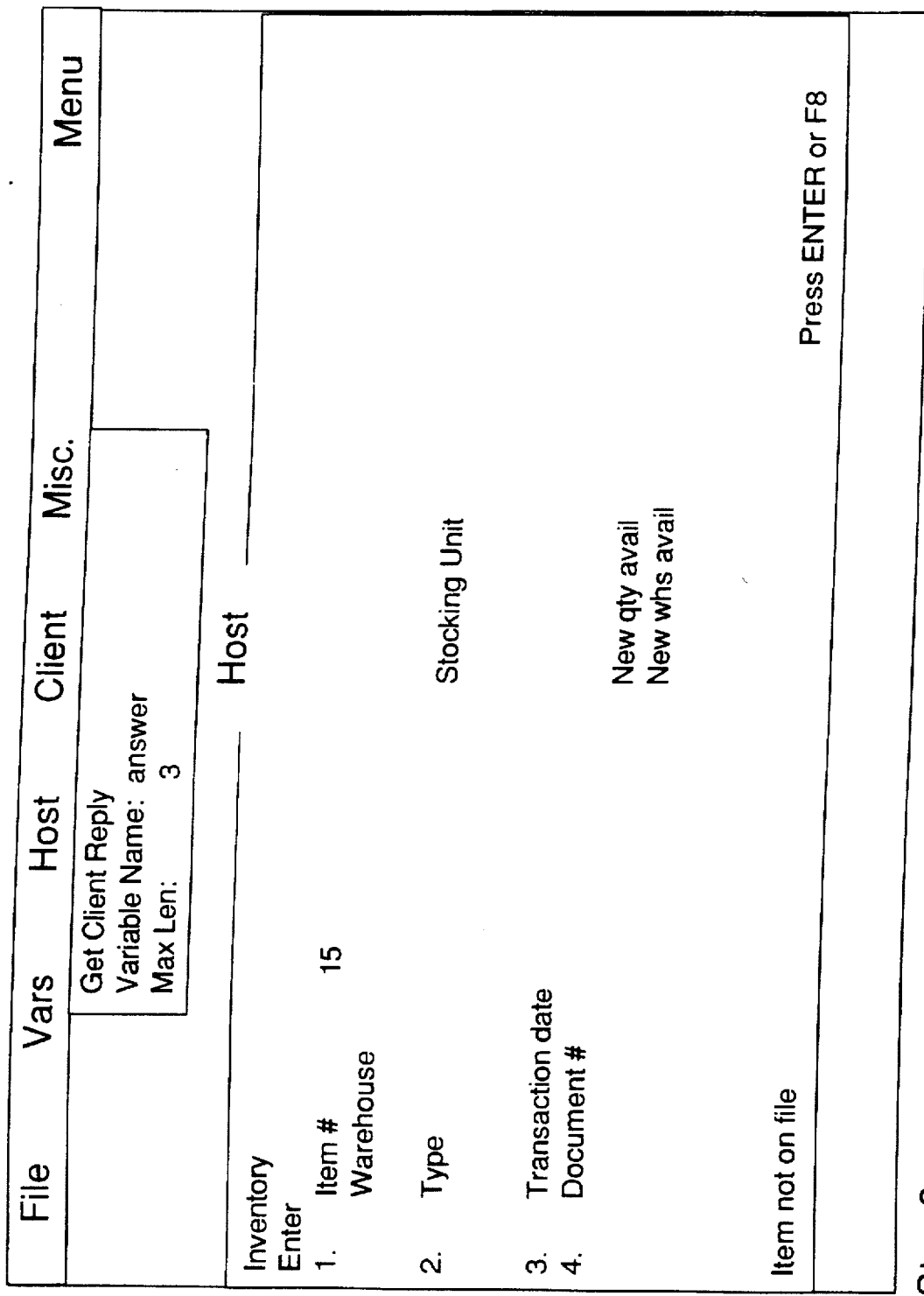

Step 8: (FIG. 70)

As demonstrated in the previous steps, get the Client reply.

Step 9: (FIG. 71)

Wait for the Client response to the prompt.

Step 10: (FIG. 72)

Wait for the Host prior to sending the "answer" just entered from the Client.

Figure 75:
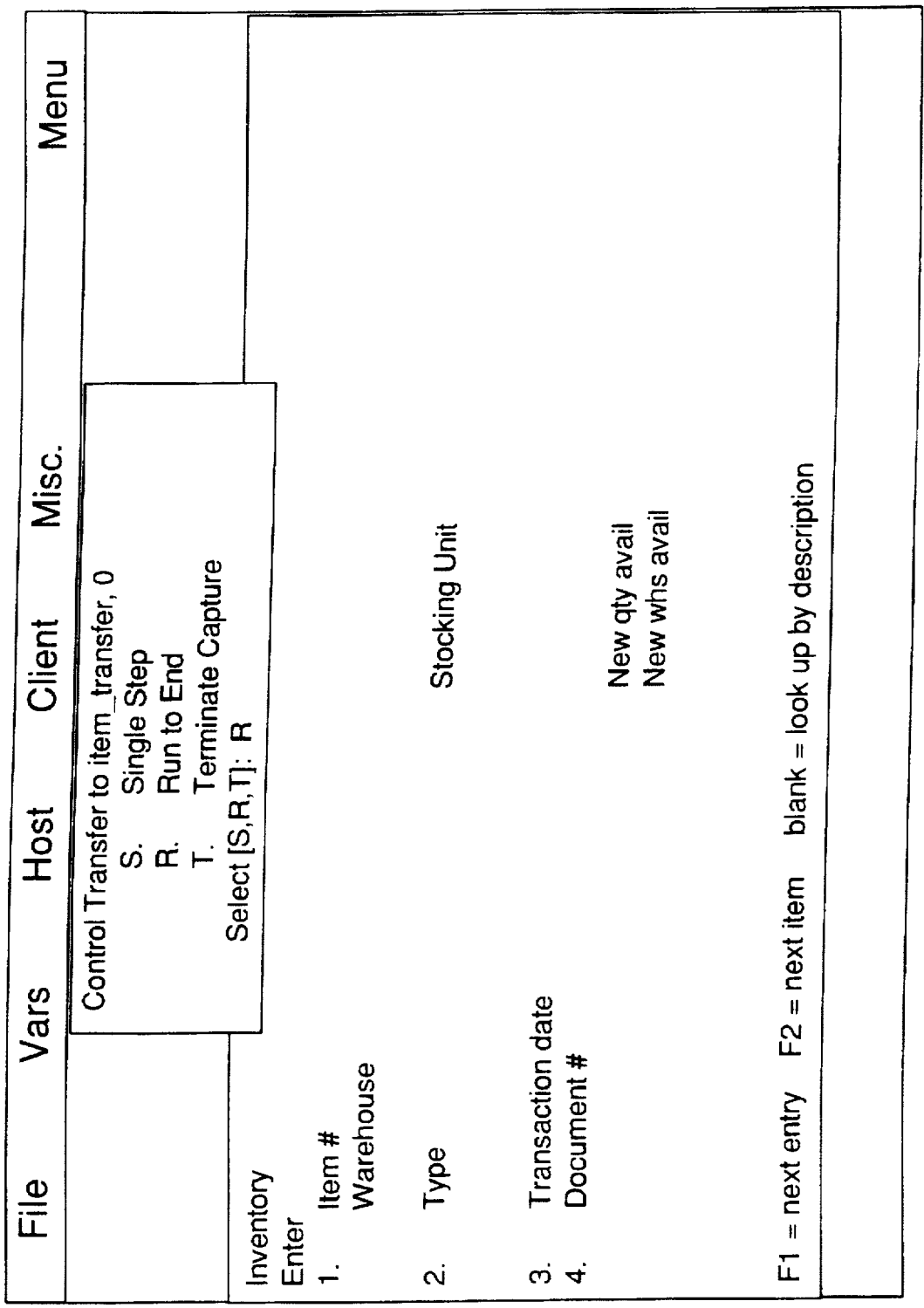

Step 11: (FIGS. 73 through 75)

The Host is now back at the item input prompt. Access the Misc menu and select [Loop] and connect this error path to the beginning of item_transfer to once again prompt the client for an item number.

Note that any error condition can be handled with this technique. It is equally correct to use any of the "Possible Response" areas of the Wait for Host dialogue box. Therefore, 5 additional "known" responses can be declared and "trained" in a similar manner as above. If you only want to train the VU for one error response that all conditions will use, then the "none of the above" option is appropriate.

Figure 4:
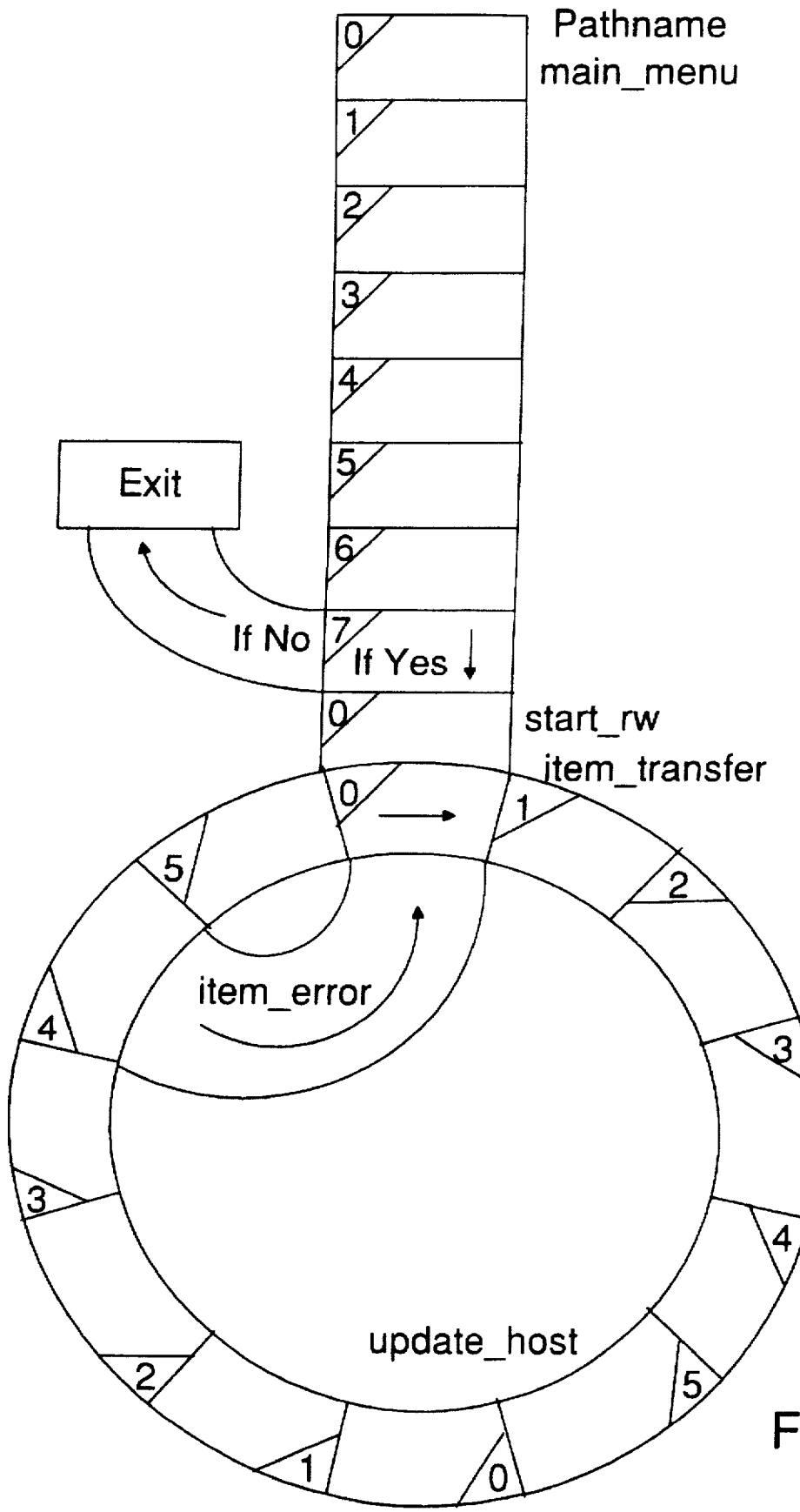
FIG. 4 is a block diagram of the Virtual User paths created during the education process.

FIG. 4 illustrates the interconnection of the various paths described in the above example. The VU trained as described above is now ready for use as an interface between the example application and a portable terminal.

Path File Primitives

The Path file specifies the sequence of steps and commands captured during the education process of the VU. Appendix A contains the Path file for the example VU illustrated above. The following primitives are used to record the host program behavior and the interaction with the human operator:

| | |
|---|---|
| $endact: | terminate path file |
| $cl_connect: | establish client connection |
| $cl_clear: | clear client screen |
| $cl_tone: | sound bell tone on client |
| $cl_move: | position client cursor |
| $cl_send: | send data to client |
| $cl_get: | get data from client |
| $cl_discon: | break connection with client |
| $host_send: | send data to host application |
| $host_connect: | establish connection to host application |
| $host_discon: | break connection with host application |
| $host_save: | store data from emulation area |
| $host_sync: | monitor host operation and compare against behavior database |
| $declare: | declare a storage variable |
| $param: | modify as system parameter |
| $set: | change the value of a variable |
| $pipe: | establish transparent connection between client and host application |
| $new_path: | begin a new sequence of operations |
| $loop: | transfer control |
| $done: | terminate a path |

-continued

| | |
|---|---|
| $vbranch: | conditionally branch on variable value |
| $exec: | execute a program procedure |

Spec File Primitives

The Spec file captures the system dependant information for use by the VU. Appendix B contains the Spec file for the example VU illustrated above. The following primitives are supported in the "program level" interface:

| | |
|---|---|
| nop: | no operation |
| mark: | label program location |
| label: | label program location |
| begin: | start a program structure |
| end: | end a program structure |
| write: | output data to host or client |
| display: | output data to client |
| send: | output data to host |
| file_write: | output data to disk file |
| get: | input data from client |
| read: | input data |
| find: | locate data on emulator screen |
| if: | conditional execution |
| else: | conditional execution |
| endif: | conditional execution |
| declare: | declare storage variable |
| param: | set system configuration |
| set: | set variable's value |
| eof: | terminate spec file |
| connect: | establish connection to client or host |
| disconnect: | break connection |
| monitor: | monitor data from host or client and compare against expected data |
| pipe: | transfer data between host or client and monitor |
| configure: | set emulation, client I/O, or host I/O configuration |
| sleep: | delay |
| capture: | enter training mode |
| include: | insert commands from sub-file |
| declare_action: | process and store a pathfile |
| run_action: | execute pathfile |
| file_open: | open a disk file |
| file_close: | close a disk file |
| spawn: | execute a system command as a subprocess |
| goto: | flow control |
| loop: | flow control |
| break: | flow control |
| exit: | flow control |
| gosub: | flow control |
| return: | flow control |
| next: | flow control |
| then: | flow control |

As disclosed by the example above, the operation of the existing program(s) is performed by the Virtual User program rather than an actual user. Thus the following functions are supported:

1. The sequence and format of the data obtained from the actual user may differ from that required by the original program.

2. User data may be combined with data from other sources for presentation to the existing application.

3. Data may be combined from multiple functions of a given application or multiple applications on a single host or even from multiple host computers for presentation to the user. Data may also be passed from one host application to another application with or without user interaction. This allows the generation of new, more complex functionality without writing new application programs.

4. The virtual user is trained with an interactive real-time, menu driven, manner. The present invention monitors the actual behavior of the target host application and stores the details of this behavior for future reference. Many aspects of host program behavior are recorded including key elements of the actual data stream as well as the contents of the emulated screen displays. This behavioral database is used by the VU module to successfully operate the host program (including the detection and interpretation of error conditions) as well as being used as a source of data for presentation to the human operator and/or passed to different data entry screen within the application and/or different host applications.

5. The VU module is able to detect unexpected actions by the host program and report them as exception conditions to the operator and/or learn the behavior and the required response.

The present invention has been implemented in the ANSI C programming language. The present invention runs under the SCO Unix operating system (Santa Cruz, Calif.) running on a 486 class workstation. The client portable terminal is any device capable of running an ANSI or VT100 terminal emulator. Such a device is the Janus J2010 Handheld (Everett, Wash.).

It will be appreciated by those of ordinary skill in the art that the present invention can be embodied in other specific forms without departing from the spirit or essential characteristics thereof. The presently disclosed embodiment is therefore considered in all respects to be illustrative and not restrictive.

```
// Example Path File
//
DECVAR answer
DECVAR item_error
DECVAR item
NEW_PATH "main_menu"
ACTION $new_path "main_menu" 0
ACTION $cl_move "main_menu" 1
    1 1
ACTION $cl_clear "main_menu" 2
    Y
ACTION $cl_send "main_menu" 3
    N "Do you want to run" ;
    <cr> <lf> ;
    "the program (y/n):"
ACTION $cl_get "main_menu" 4
```

-continued

```
        answer N 1
    ACTION $vbranch "main_menu" 5
        answer 5
    Y 0 "start_rw" Y "y"
    Y 0 "exit" Y "n"
    N N
    N N
    N N
    EDISPATCH
    NEW_PATH "start_rw"
    ACTION $new_path "start_rw" 0
    ACTION $h_pty "start_rw" 1
        "go_rw" ; ""
    ACTION $loop "start_rw" 2
        Y 0 "nav_menus"
    NEW PATH "exit"
    ACTION $new_path "exit" 0
    NEW_PATH "nav menus"
    ACTION $new_path "nav_menus" 0
    ACTION $host_sync "nav_menus" 1
        D 0 N
        N 2
            10 1 "H_" <esc> "[24;42H"
            24 14 26 "o continue, or ESC to exit"
            1 1 0
    EDISPATCH
    ACTION $host_send "nav_menus" 2
        N <cr>
    ACTION $loop "nav_menus" 3
        Y 0 "item_transfer"
        NEW_PATH "item_transfer"
        ACTION $new_path "item_transfer" 0
        ACTION $cl_clear "item_transfer" 1
        Y
    ACTION $cl_move "item_transfer" 2
        1 1
    ACTION $cl_send "item_transfer" 3
        N "item:"
    ACTION $cl_get "item_transfer" 4
        item N 10
    ACTION $loop "item_transfer" 5
        Y 0 "update_host"
    NEW_PATH "update_host"
    ACTION $new_path "update_host" 0
    ACTION $cl_clear "update host" 1
        Y
    ACTION $cl_move "update-host" 2
        1 1
    ACTION $cl_send "update_host" 3
        N "Processing Data"
    ACTION $host_sync "update_host" 4
        D 0 N
        N 1
        10 2 "_" <esc> "[3;27H
        0 0 0
        0 0 0
    EDISPATCH
    ACTION $host_send "update_host" 5
        N item ;
        <cr>
    ACTION $loop "update_host" 6
        Y 0 "item_error"
    NEW_PATH "item_error"
    ACTION $new_path "item_error" 0
    ACTION $host_sync "item_error" 1
        D 0 N
        N 1
            10 1 " " <G><esc> "[24;79H"
            0 0 0
            0 0 0
    EDISPATCH
    ACTION $host_save "item_error" 2
        item_error 24 2 16
    ACTION $cl_clear "item_error" 3
        Y
    ACTION $cl_move "item-error" 4
        1 1
    ACTION $cl_tone "item error" 5
        Y
    ACTION $cl_send "item_error" 6
```

```
        N item_error
        <cr> <lf>;
        "Press ENTER to" ;
        <cr> <lf> '
        "continue:"
ACTION $cl_get "item_error" 7
    answer N 32
ACTION $host_sync "item_error" 8
    D 0 N
    N 1
        10 1 " " <^G><esc> "|24;79H"
        0 0 0
        0 0 0
ACTION $host_send "item_error" 9
    Y 0 "item_transfer"
END_ACTION
EOF
// test capture spec file                              // designates a comment line
//
declare ans " "                                       Declare storage variables
declare foo " "
goto start                                            Bypass function definition(s)
// - - - - - - - - - - - - - - - - - - - - - - - - -
// client connetion                                   Provide for connection to client
                                                      Replace with appropriate connect
mark go_client                                        for production version
param $term_size 4,20                                 Set client window size
declare mode #2                                       Read command line argument "#2"
if mode = "slave" then                                Slave connection is via unix Pipes
connect remote pipe "/usr/pipes/fr_client"; "/usr/pipes/to_client"
else                                                  Otherwise use a default connection
connect remote tty "/dev/tty07"                       to terminal no. 7
configure remote "raw"                                use in "raw" mode
endif
display <cls>      <cpos 2,4> "ScreenShaper"          Clear client screen and display a
display            <cpos 3,3> "Copyright 1994"        standard startup message
display            <cpos 4,1> "Orchid Systems, Inc."
display            <cpos 6,1>
return                                                return to caller of function
// - - - - - - - - - - - - - - - - - - - - - - - - -
mark start                                            This is the actual start point
gosub go_client                                       Open the client connection
declare_action #1                                     Read in the PATHFILE specified on
                                                      the command line
// during development: use "capture"
// during production: use "run_action"
capture                                               Execute the capture function
// run_action                                         or execute the run_act function
disconnect host                                       End connection to host
disconnect remote                                     End connection to client
eof                                                   End the program execution
```

What is claimed is:

1. A system for translating a first user interface of a preexisting application running on a host computer to a second user interface running on a client computer, wherein the user interface consists of prompts for input and a set of displays for output, comprising:

a training computer in communication with said host computer and adapted to interactively monitor and capture a first set of prompts and displays generated by a first user concurrently operating said first user interface of said preexisting application program running on said host computer via said training computer, adapted to convert said first set of prompts and displays into a second set of prompts and displays for presentation via said second user interface on said client computer, said second set of prompts and displays selected by said first user, and further adapted to store said first set of prompts and displays associated with said second set of prompts and displays; and a translating computer in communication with said host computer and said client computer and adapted to monitor said preexisting application first user interface for said first set of prompts and displays, and further adapted to display on said second user interface on said client computer said second set of prompts and displays associated with said first set of prompts and displays;

whereby a second user operating said client computer interacts, through said translating computer, with said preexisting application running on said host computer via said second set of prompts and displays.

2. The apparatus of claim 1 wherein said training computer and said host computer are a single computer adapted to operate as said host computer and said training computer.

3. The apparatus of claim 1 wherein the first user interface comprises a first information display capable of displaying a first amount of information and said second user interface comprises a second information display capable of displaying a second amount of information, where said first amount of information is not equal to said second amount of information.

4. The apparatus of claim 1 wherein said preexisting application comprises at least two separate computer programs, said at least two separate computer programs running concurrently.

5. The apparatus of claims 1 or 4 wherein said conversion of said first set of prompts and displays into said second set of prompts and displays comprises capturing a portion of said first set of prompts and displays as said second set of prompts and displays.

6. The apparatus of claims 1 or 4 wherein said conversion of said first set of prompts and displays into said second set of prompts and displays comprises capturing a portion of said first set of prompts and displays and defining said second set of prompts and displays as a one of a series of predefined sets of prompts and displays, wherein said one of said series of predefined prompts and displays is selected based upon said first set of prompts and displays.

7. The apparatus of claims 1 or 4 wherein said conversion of said first set of prompts and displays into said second set of prompts and displays comprises capturing a portion of said first set of prompts and displays and defining said second set of prompts and displays as a one of a series of predefined sets of prompts and displays, wherein said one of said series of predefined prompts and displays is selected based upon said second user interacting on said client computer.

* * * * *

UNITED STATES PATENT AND TRADEMARK OFFICE
CERTIFICATE OF CORRECTION

PATENT NO. : 5,627,977

DATED : May 6, 1997

INVENTOR(S) : Neil Hickey, Robert W. Anthony and Seth A. Spiller

It is certified that error appears in the above-indentified patent and that said Letters Patent is hereby corrected as shown below:

Column 3, line 62: please delete "." after "application".

Column 8, line 33: please delete "[h]"; and insert therefor -- [n] --.

Column 8, line 48: please delete "Vats"; and insert therefor -- Vars --.

Column 9, line 46: please delete "Vats"; and insert therefor -- Vars --.

Signed and Sealed this

Twenty-ninth Day of July, 1997

Attest:

BRUCE LEHMAN

*Attesting Officer*  *Commissioner of Patents and Trademarks*